United States Patent
Yonehara

(10) Patent No.: US 8,670,878 B2
(45) Date of Patent: Mar. 11, 2014

(54) PORTABLE EQUIPMENT

(71) Applicant: Denso Corporation, Kariya (JP)

(72) Inventor: Satoshi Yonehara, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/795,593

(22) Filed: Mar. 12, 2013

(65) Prior Publication Data

US 2013/0245858 A1 Sep. 19, 2013

(30) Foreign Application Priority Data

Mar. 16, 2012 (JP) ................................ 2012-060818
Aug. 31, 2012 (JP) ................................ 2012-191362

(51) Int. Cl.
*G06F 7/00* (2006.01)
(52) U.S. Cl.
USPC .............. 701/2; 250/343; 250/493.1; 40/590; 340/870.02; 349/12
(58) Field of Classification Search
None
See application file for complete search history.

(56) References Cited

U.S. PATENT DOCUMENTS

| 2002/0186144 | A1* | 12/2002 | Meunier | 340/825.28 |
| 2006/0129691 | A1* | 6/2006 | Coffee et al. | 709/230 |
| 2010/0202346 | A1* | 8/2010 | Sitzes et al. | 370/328 |
| 2011/0279311 | A1* | 11/2011 | Hamano | 342/357.25 |
| 2011/0283322 | A1* | 11/2011 | Hamano | 725/44 |

FOREIGN PATENT DOCUMENTS

| JP | 11-184602 | 7/1999 |
| JP | 2006-352460 | 12/2006 |
| JP | B2-4380459 | 12/2009 |
| JP | 2010-064607 | 3/2010 |
| JP | 2010-165087 | 7/2010 |

* cited by examiner

*Primary Examiner* — McDieunel Marc
(74) *Attorney, Agent, or Firm* — Harness, Dickey & Pierce, PLC

(57) ABSTRACT

Portable equipment for displaying a vehicle page, indicative of information relating to a vehicle corresponding to the portable equipment, on a screen of a display unit, includes: a reading request receiving device that receives a reading request manipulation for requesting to display the vehicle page; a position information acquisition device that acquires position information of the portable equipment and the vehicle; an item selection device that specifies an area, in which the position of the portable equipment and the vehicle is disposed, and selects an item of a top page of the display unit according to the area among multiple items; and a page display controller that controls the display unit to display the item of the top page on the screen.

10 Claims, 32 Drawing Sheets

FIG. 11

| DISPLAY ITEM | VEH SITU INF | REMOTE OPE ITEM |
|---|---|---|
| REMOTE CHARGE | BAT ENE LEV<br>P S CONNECTION | CHARGE OPE (START, STOP, RESERVE, ETC.) |
| PRE-A/C | IN TEMP | PRE-A/C OPE (START, STOP, RESERVE, ETC.) |
| REMOTE START | EXT TEMP | REMOTE START OPE (START, STOP, RESERVE, ETC.) |
| REMOTE DR OPEN/CLOSE | DR OPEN/CLOSE | REMOTE DR OPEN/CLOSE OPE (START, STOP, RESERVE, ETC.) |
| VEH POS GRASP | (VEH/PORT EQUIP POS) | DISP OPE OF POS RELATION BET VEH AND PORT EQUIP |
| VEH MOVE RANGE MONITOR | AREA DEVI HIS | CHECK OPE OF VEH DEVI FROM DESIGN AREA |
| REMOTE DIALOGUE | DIALOGUE | DIALOGUE DISPLAY OPE |
| FUEL LEV MONITOR | FUEL LEVEL | – |
| VEH LOCK-ON MONITOR | THEFT INF | DISPLAY OPE OF VEH LOCK-ON INF |

FIG. 12

REMOTE CHARGE

| CHARGE LEV | DISPLAY PRIORITY |
|---|---|
| 100 % - 80 % | 20 |
| 80 % - 50 % | 17 |
| 50 % - 30 % | 10 |
| 30 % - 20 % | 5 |
| 20 % - 10 % | 4 |
| 10 % - 5 % | 3 |
| 5 % - 3% | 2 |
| 3 % - | 1 |

FIG. 13

PRE-A/C

| IN TEMP | DISPLAY PRIORITY |
|---|---|
| - 32°C | 4 |
| 32°C - 27°C | 7 |
| 27°C - 22°C | 15 |
| 22°C - 18°C | 12 |
| 18°C - 10°C | 7 |
| 10°C - 0°C | 5 |
| 0°C - | 4 |

FIG. 14

ITEM GROUP #00
SITU: VEH AROUND HOME / USER POS UNSPECIFIED

| DISPLAY ITEM | DISPLAY? | REASON |
|---|---|---|
| REMOTE CHARGE | NO DISPLAY | CHARGE FACILITY UNCERTAIN |
| PRE-A/C | NO DISPLAY | HIGH POSSIBILITY OF USAGE IN THESE DAYS |
| REMOTE START | NO DISPLAY | HIGH POSSIBILITY OF USAGE IN THESE DAYS |
| REMOTE DR OPEN/CLOSE | NO DISPLAY | FOR SECURITY |
| VEH POS GRASP | DISPLAY | USER MAY LOSE VEH POS |
| VEH MOVE RANGE MONITOR | DISPLAY | OTHER PERSON MAY DRIVE |
| REMOTE DIALOGUE | DISPLAY | HIGH PRIORITY AT DISPLAY TIMING ONLY BECAUSE OF REGULAR DISPLAY |
| FUEL LEV MONITOR | DISPLAY | USER MAY USE SOON |
| VEH LOCK-ON MONITOR | DISPLAY | NECESSARY IN CASE OF VEH THEFT |

FIG. 15

ITEM GROUP #01
SITU: VEH/USER IN UNREGISTERED PLACE FAR FROM HOME (E.G., TRAVEL)

| DISPLAY ITEM | DISPLAY? | REASON |
| --- | --- | --- |
| REMOTE CHARGE | NO DISPLAY | CHARGE FACILITY UNCERTAIN |
| PRE-A/C | NO DISPLAY | VEH USAGE UNCERTAIN |
| REMOTE START | NO DISPLAY | VEH USAGE UNCERTAIN |
| REMOTE DR OPEN/CLOSE | NO DISPLAY | FOR SECURITY |
| VEH POS GRASP | NO DISPLAY (NOTE #1) | (#1) "DISPLAY" WHEN DIS BET VEH/PORT EQUIP ≤ PREDET DISTANCE |
| VEH MOVE RANGE MONITOR | NO DISPLAY | VEH OUTSIDE DESIGNATED RANGE |
| REMOTE DIALOGUE | DISPLAY | HIGH PRIORITY AT DISPLAY TIMING ONLY BECAUSE OF REGULAR DISPLAY |
| FUEL LEV MONITOR | DISPLAY | USER MAY DRIVE VEH FAR DISTANCE |
| VEH LOCK-ON MONITOR | DISPLAY | NECESSARY IN CASE OF VEH THEFT |

FIG. 16

ITEM GROUP #12
SITU: USER/VEH AT HOME

| DISPLAY ITEM | DISPLAY? | REASON |
|---|---|---|
| REMOTE CHARGE | DISPLAY | HIGH POSSIBILITY OF CHARGE AT HOME. |
| PRE-A/C | DISPLAY | HIGH POSSIBILITY OF MAIN USER USAGE |
| REMOTE START | DISPLAY | HIGH POSSIBILITY OF MAIN USER USAGE |
| REMOTE DR OPEN/CLOSE | DISPLAY | HIGH POSSIBILITY OF MAIN USER USAGE |
| VEH POS GRASP | NO DISPLAY | VEH AT HOME. |
| VEH MOVE RANGE MONITOR | NO DISPLAY | VEH AT HOME. |
| REMOTE DIALOGUE | DISPLAY | HIGH PRIORITY AT DISPLAY TIMING ONLY BECAUSE OF REGULAR DISPLAY |
| FUEL LEV MONITOR | DISPLAY | HIGH POSSIBILITY OF MAIN USER USAGE |
| VEH LOCK-ON MONITOR | NO DISPLAY | VEH AT HOME. |

FIG. 17

ITEM GROUP #23
SITU: USER/VEH AT OFFICE

| DISPLAY ITEM | DISPLAY? | REASON |
|---|---|---|
| REMOTE CHARGE | NO DISPLAY | CHARGE IMPOSSIBLE. |
| PRE-A/C | DISPLAY | HIGH POSSIBILITY OF MAIN USER USAGE |
| REMOTE START | DISPLAY | HIGH POSSIBILITY OF MAIN USER USAGE |
| REMOTE DR OPEN/CLOSE | DISPLAY | HIGH POSSIBILITY OF MAIN USER USAGE |
| VEH POS GRASP | NO DISPLAY (NOTE #2) | (#2) "DISPLAY" WHEN WIDE OFFICE AREA |
| VEH MOVE RANGE MONITOR | NO DISPLAY | VEH AT OFFICE |
| REMOTE DIALOGUE | DISPLAY | HIGH PRIORITY AT DISPLAY TIMING ONLY BECAUSE OF REGULAR DISPLAY |
| FUEL LEV MONITOR | DISPLAY | HIGH POSSIBILITY OF MAIN USER USAGE |
| VEH LOCK-ON MONITOR | NO DISPLAY | VEH AT HOME |

FIG. 23

| COMPLEMENT INF | COR OBJECT DISPLAY ITEM | COR CONDITION | COR CONTENT |
|---|---|---|---|
| TIME INF | PRE-A/C | DAYTIME (E.G., 10:00 - 15:00) | INCREASE PRIORITY (DISP PRIORITY: -2) |
| USER AGE | VEH MOVE RANGE MONITOR | YOUNG DRIVER (E.G., 22 OR LESS) | DECREASE PRIORITY (DISP PRIORITY: +2) |
| SEX | PRE-A/C | MALE: IN TEMP ≥ CERTAIN TEMP | INCREASE PRIORITY (DISP PRIORITY: -2) |
| | | FEMALE: IN TEMP ≤ CERTAIN TEMP | INCREASE PRIORITY (DISP PRIORITY: -2) |
| WEATHER | PRE-A/C | RAIN OR SNOW | DECREASE PRIORITY (DISP PRIORITY: +3) |

PORTABLE EQUIPMENT

CROSS-REFERENCE TO RELATED APPLICATIONS

This application is based on Japanese Patent Applications No. 2012-60818 filed on Mar. 16, 2012, and No. 2012-191362 filed on Aug. 31, 2012, the disclosures of which are incorporated herein by reference.

TECHNICAL FIELD

The present disclosure relates to portable equipment having a display screen.

BACKGROUND

Vehicles include those whose predetermined features can be implemented by operating portable equipment which a user carries with him/her. In recent years, the number of such remote operation features has increased. Portable equipment to be used to selectively implement numerous remote operation features is available (refer to, for example, patent literature 1 (JP-A-2010-165087)).

However, in the portable equipment, which of the numerous remote operation features is used depends on a user's own decision. As a result, although effective features are available in users' various situations, the features may be neither noticed nor employed. Anyway, the portable equipment is not user-friendly.

The patent literature 1 has disclosed an art for restricting employment of remote operation features, which can be implemented, on the basis of a distance between a user and a vehicle. However, the art does not solve the foregoing problem.

SUMMARY

It is an object of the present disclosure to provide portable equipment whose user-friendliness is improved by realizing to display an image, which depends on a situation relating to a user and a vehicle, in case of displaying information about multiple functions on a screen.

According to an example aspect of the present disclosure, portable equipment for displaying a vehicle page, indicative of information relating to a vehicle corresponding to the portable equipment, on a screen of a display unit, the portable equipment includes: a reading request receiving device that receives a predetermined reading request manipulation for requesting to display the vehicle page; a position information acquisition device that acquires position information of at least one of the portable equipment and the vehicle when the reading request receiving device receives the reading request manipulation; an item selection device that identifies a position of the at least one of the portable equipment and the vehicle according to the position information, specifies an area, in which the position of the at least one of the portable equipment and the vehicle is disposed, and selects an item of a top page, which is to be displayed initially as the vehicle page on the display unit, according to the area among a plurality of predetermined items; and a page display controller that controls the display unit to display the item of the top page on the screen.

According to the above portable equipment, plural pre-registered areas are associated in advance with items of pieces of information which should be displayed when a vehicle exists in the respective areas or items of pieces of information which should be displayed when portable equipment exists in the respective areas (that is, a user carrying the portable equipment exists). When a top page is displayed, the items associated with such an area are picked up and regarded as candidates for display. The items that are not associated with the area and need not be displayed are automatically hidden. In other words, only items of pieces of information that will prove useful in each area are displayed on the screen, but items of pieces of information that need not be employed are not displayed on the screen. Therefore, vehicle features the number of which is more and more increasing these days can be effectively utilized according to a scene.

BRIEF DESCRIPTION OF THE DRAWINGS

The above, and other objects, features and advantages of the present disclosure will become more apparent from the following detailed description made with reference to the accompanying drawings. In the drawings:

FIG. 11 is a diagram showing the relationship of association between display items which can be displayed in portable equipment, and pieces of vehicle situational information;

FIG. 12 is a diagram showing the first example of pieces of information to be referenced at the time of determining display priorities of display items;

FIG. 13 is a diagram showing the second example of pieces of information to be referenced at the time of determining the display priorities of display items;

FIG. 14 is a diagram showing a first example of the relationship of association between pairs (situation) of areas in which portable equipment and an associated vehicle exist and display items;

FIG. 15 is a diagram showing a second example of the relationship of association between the pairs (situation) of the areas in which the portable equipment and associated vehicle exist and the display items;

FIG. 16 is a diagram showing a third example of the relationship of association between the pairs (situation) of the areas in which the portable equipment and associated vehicle exist and the display items;

FIG. 17 is a diagram showing a fourth example of the relationship of association between the pairs (situation) of the areas in which the portable equipment and associated vehicle exist and the display items;

FIG. 23 is a diagram showing another example of pieces of vehicle situational information to be acquired by portable equipment in FIG. 5;

DETAILED DESCRIPTION

Figure 1A:
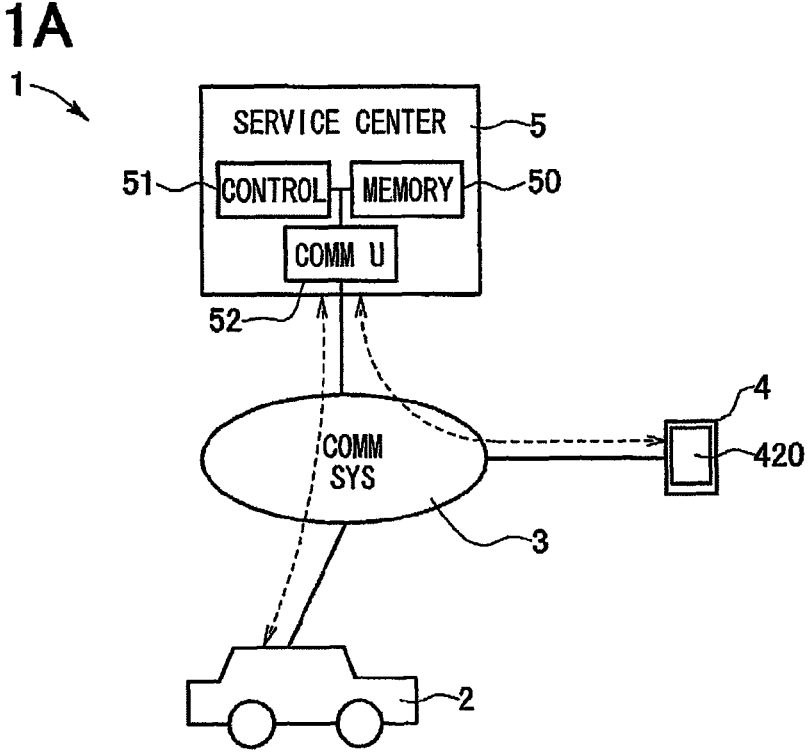
FIG. 1A is a block diagram schematically showing the configuration of a vehicle information display system that utilizes portable equipment of a first embodiment.

Referring to the drawings, an example of a vehicle information display system including portable equipment will be described below.

First Embodiment

A vehicle information display system 1 in which the present embodiment is employed includes, as shown in FIG. 1A, portable equipment 4, an associated vehicle 2 associated with the portable equipment 4, and a service center 5 that intervenes between the portable equipment 4 and associated vehicle 2 during communication of them. The portable equipment 4 and associated vehicle 2 are connected to the service center 5 over an external communication means (i.e., an external communication system) 3 such as the Internet, and can transmit or receive information to or from each other by involving the service center 5.

Figure 2:
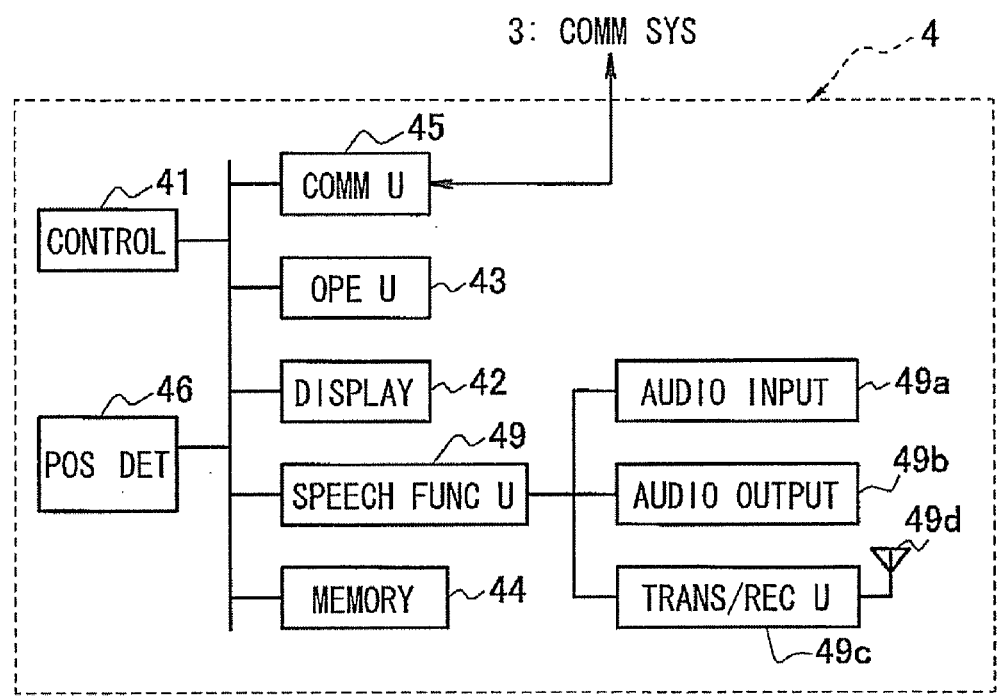
FIG. 2 is a block diagram schematically showing the configuration of the portable equipment shown in FIG. 1A to FIG. 1D.

The portable equipment 4 has, as shown in FIG. 2, a display unit 42, which includes a screen 420 (see FIG. 1A) for display such as a liquid crystal display, an operating unit 43 such as mechanical switches or touch switches, a memory unit 44 such as a flash memory, a communication unit 45 that serves as a communication interface for connection onto the external communication means 3, and a position detector 46 connected to a control unit 41 that includes a CPU, ROM, and RAM. The control unit 41 can display on the screen 420 of the display unit 42 associated vehicle pages in which pieces of information on the associated vehicle 2 located in a remote place are shown.

Further, the portable equipment 4 of the present embodiment is formed as a portable cellular phone. A speech effecting unit (i.e., speech function unit) 49 is connected to the control unit 41. In an audio speech mode, an audio signal collected by an audio input unit 59a such as a microphone is subjected to predetermined processing by the speech effecting unit 49 and a transmitting/receiving unit 49c and wirelessly transmitted through an antenna 49d. In addition, in the audio speech mode, a receiving signal received through the antenna 49d is subjected to predetermined processing by the speech effecting unit 49 and transmitting/receiving unit 49c, and thus converted into an analog audio signal. The analog audio signal is outputted to outside via an audio output unit (loudspeaker) 49b. Accordingly, a speech can be made in order to communicate with another portable cellular phone.

Figure 3:
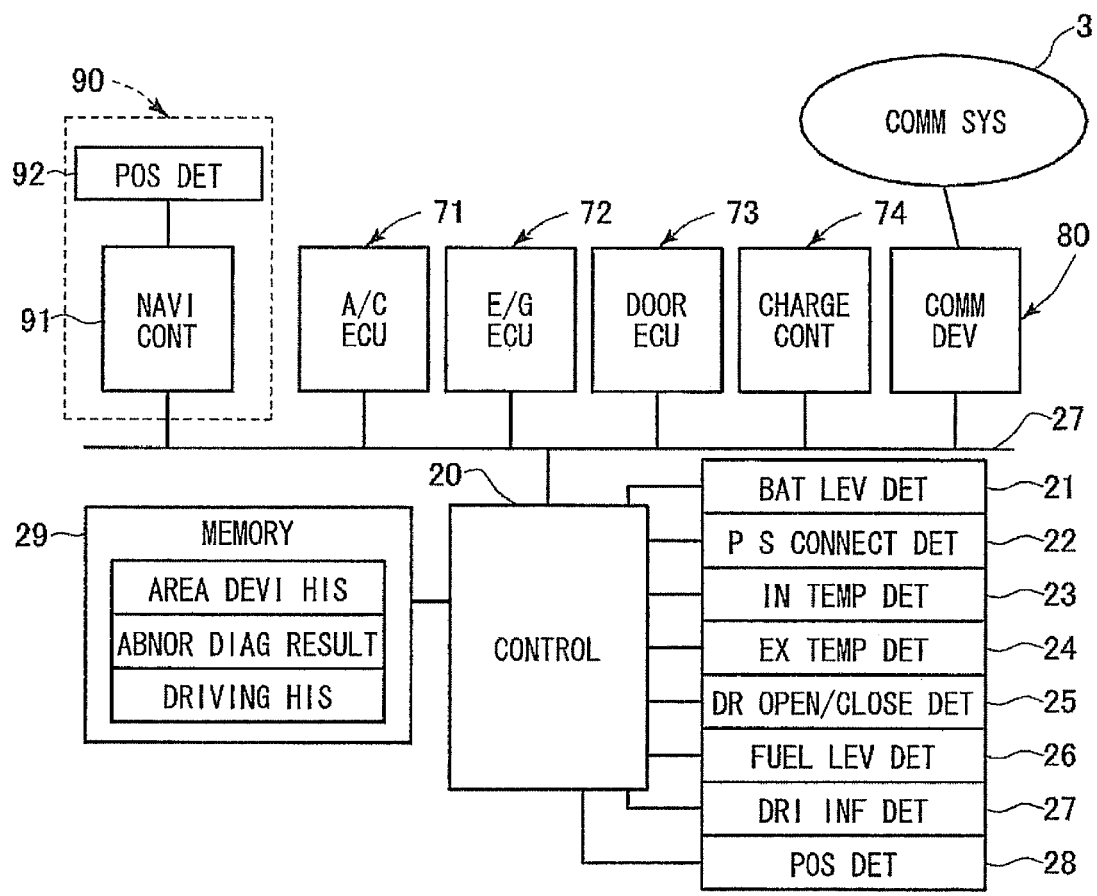
FIG. 3 is a block diagram schematically showing the configuration of an associated vehicle shown in FIG. 1A to FIG. 1D.

The associated vehicle 2 has, as shown in FIG. 3, various types of detection units 21 to 26, which detect various pieces of vehicle situation information, and a memory unit 29 such as a hard disk drive connected to a control unit 20 including a CPU, ROM, and RAM. Further, via an in-vehicle communication bus 27 like CAN, the control unit 20 is connected to a navigation device 90, a communication device 80 to be used to connect the associated vehicle onto the external communication means 3, and other pieces of onboard equipment (herein, control units 71 to 74 of the pieces of onboard equipment). Pieces of information acquired from the various detection units 21 to 25 may be communicated from the other pieces of onboard equipment.

The navigation device 90 has, as shown in FIG. 3, a position detector 92, a known display unit such as a liquid crystal display, a known audio output unit including an audio synthesis circuit and loudspeaker, a known operating input unit including mechanical switches, touch switches, a remote controller, and an audio input unit, a memory unit such as a hard disk drive connected to a navigation control unit 91 including a CPU, ROM, and RAM. The control unit 91 implements control on the basis of a navigation program and data which are stored in the memory unit, and can thus perform routing assistance to a destination through display on a display device or audio output from the audio output unit.

The position detectors 46 and 92 are known positional information acquisition units that identify the current position of the associated vehicle 2 or portable equipment 4 in which the position detectors are included, and that each include a GPS receiver which detects the position of the associated vehicle 2 or portable equipment 4 on the basis of radio waves from satellites.

The service center 5 is known external terminal equipment that has a memory unit 50 such as a hard disk drive and a communication unit 52, which serves as a communication interface for connecting the service center onto the external communication means 3, connected to a control unit 51 including a CPU, ROM, and RAM.

In the memory unit 44 of the portable equipment 4, an application (vehicle information display application) that displays pieces of information on the associated vehicle 2 is stored. The application is run when the control unit 41 (reading requesting manipulation acceptance means) accepts a predetermined user manipulation (reading requesting manipulation) that has been performed at the operating unit 43. Due to the execution, the control unit 41 displays on the screen 420 of the display unit 42 associated vehicle pages, in which pieces of information on the associated vehicle 2 are shown, along with the processing of the application. As for the associated vehicle pages, predetermined remote operation features relevant to the associated vehicle 2 can be implemented through the top page 100 (except a login page), which is shown first as the associated vehicle page or a page to which a page shift is made from the top page.

Now, the processing of the application, that is, display processing for the associated vehicle pages 100 will be described below in conjunction with FIG. 4.

When the control unit 41 accepts a manipulation (reading requesting manipulation) of executing the application performed by a user, the control unit 41 first displays on the screen 420 of the display unit 42 an authentication screen image (login page) that prompts the user to enter user authentication information (S101). After the user authentication information (user ID and password) is entered by performing a predetermined manipulation at the operating unit 43, when the entry is finalized (Yes at S102), the control unit 41 transmits the entered and finalized user authentication information to the service center (terminal equipment) 5 over the external communication means 3 (S103), and enters a waiting state for receiving of a result of authentication (S104).

Figure 24:
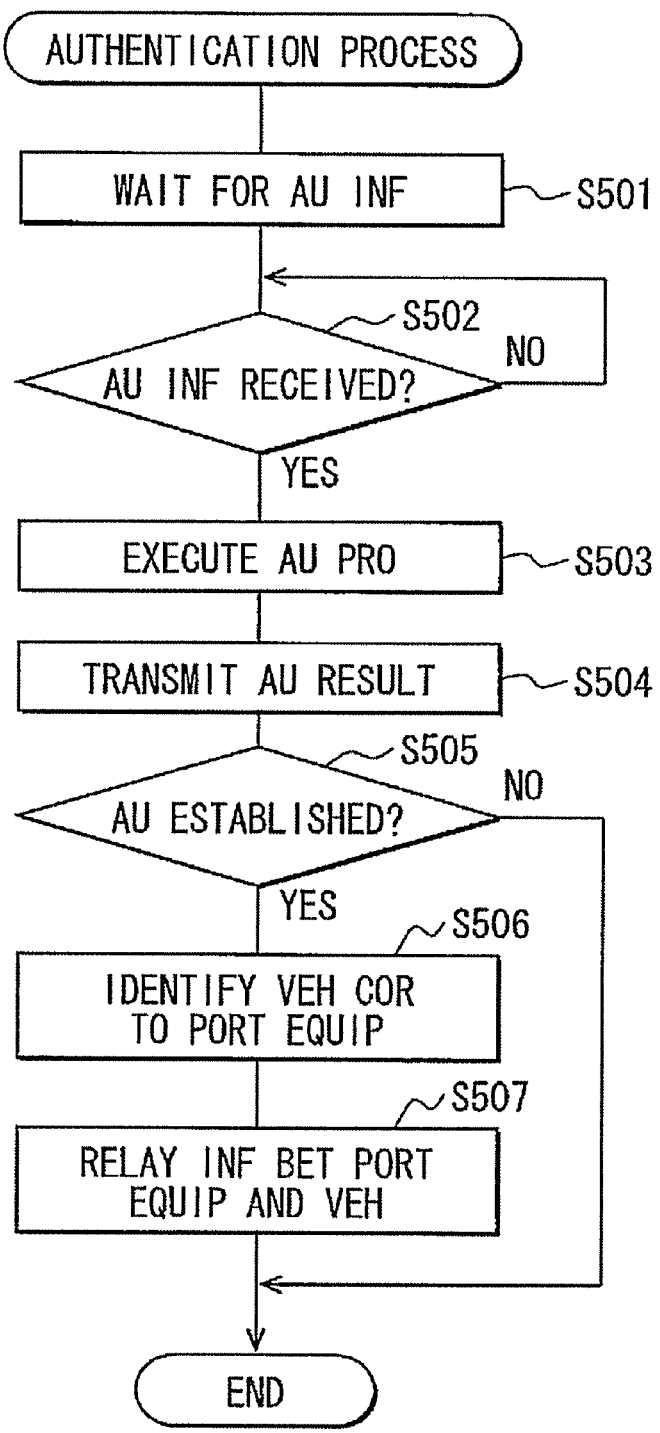
FIG. 24 is the first example of a flowchart describing the flow of authentication processing.

In the control unit 51 of the service center 5, master information for user authentication is stored in the memory unit 50. As mentioned in FIG. 24, the control unit 51 performs authentication processing on the transmitted user authentication information on the basis of the master information (S501 to S503), and transmits a result of the authentication to the portable equipment 4 over the external communication means 3 (S504). Further, the service center 5 stores the relationship of association of the user and associated vehicle 2, which is included in the master information, in the memory unit 50. Therefore, the control unit 51 references the stored information so as to identify the associated vehicle 2 of the portable equipment 4, which is the transmission source, on the basis of the user authentication information on the user whose authenticity has been established (S505 and S506). Thereafter, the control unit 51 relays transmission of an information request from the portable equipment 4 to the associated vehicle 2 and transmission of information from the associated vehicle 2 to the portable equipment 4 in response to the request (S507). In the present embodiment, the service center 5 relays communication between the portable equipment 4 and associated vehicle 2 for the purpose of improving security.

To be more specific, the control unit 51 stores in the memory unit 50 the relationship of association of the portable equipment 4 with the associated vehicle 2. When the control unit 51 receives transmission information sent from the portable equipment 4 to the associated vehicle 2, since the transmission information includes identification information and authentication information on the portable equipment 4 that is a transmission source, the control unit 51 authenticates or identifies the portable equipment 4 on the basis of the identification information and authentication information. Then, the associated vehicle 2 for the identified portable equipment 4 is identified based on the above relationship of association and the transmission information, mentioned above is sent to the associated vehicle 2. In contrast, when the control unit 51 receives transmission information sent from the associated vehicle 2 to the portable equipment 4, since the transmission information include identification information and authentication information on the associated vehicle 2 that is a transmission source, the control unit 51 authenticates and identifies the associated vehicle 2 on the basis of the identification information. In addition, the control unit 51 identifies the portable equipment 4 associated with the identified associated vehicle 2 on the basis of the relationship of association, and transmits the transmission information to the identified portable equipment 4.

The control unit 41 receives a result of authentication sent from the service center 5 over the external communication means 3. If the result of authentication demonstrates that the authenticity has been established (Yes at S105), the control unit 41 displays on the screen 420 of the display unit 42 the top page 100 out of the associated vehicle pages (S106). The detail of display processing for the top page 100 will be described later. In contrast, if the authenticity is not established (No at S105), the control unit 41 returns to the display of the authentication screen image (S101).

After the top page 100 is displayed, if the control unit 41 accepts a predetermined reading manipulation that is enabled in the displayed page (Yes at S107), the control unit 41 implements the reading manipulation feature (S108). For example, if a manipulative entry intended to implement a predetermined remote operation feature in the associated vehicle 2 is made through the page displayed on the screen 420, the feature is implemented in the associated vehicle 2. If a page shift manipulation is performed, a page shift feature of switching a display page to a page designated with the manipulation is implemented.

If a manipulation of terminating the application (reading terminating manipulation) is performed by a user (Yes at S109), the control unit 41 terminates display of the page relevant to the application on the screen 230 (S110), and thus terminates the application.

Figure 5:
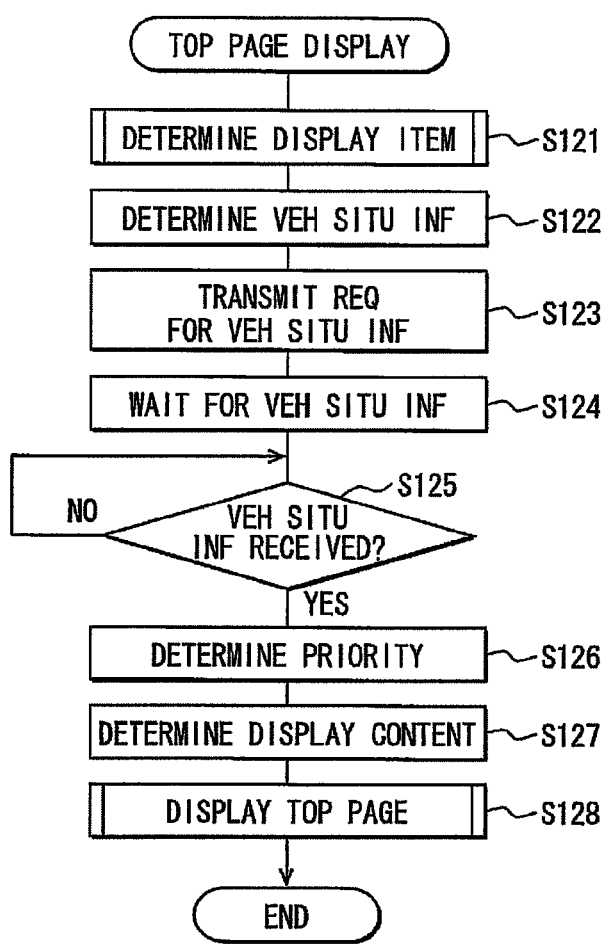
FIG. 5 is the first example of a flowchart describing the flow of top page display processing.

Next, the aforesaid display processing for the top page 100 will be described in conjunction with FIG. 5.

First, the control unit 41 determines display items (items) to be shown in the top page 100 (S121: item selection means). In the present embodiment, the control unit 41 first acquires positional information on either the portable equipment 4 or associated vehicle 2 or pieces of positional information on both of them, and identifies the position of either of the portable equipment 4 or associated vehicle 2 or the positions of both of them. Based on either an area to which the identified position of the portable equipment 4 belongs, an area to which the identified position of the associated vehicle 2 of the portable equipment 4 belongs, or both of the areas, the control unit 41 determines or picks up display items, which are shown in the top page 100, from among plural predetermined display items (see FIG. 11). The detail of display item determination processing will be described later.

After the display items are picked up, the control unit 41 displays on the screen 420 of the display unit 42 the top page 100 in which pieces of information on the determined display items are shown (page display control means).

In the present embodiment, the control unit 41 acquires pieces of vehicle situation information that represent predetermined vehicle situations of the associated vehicle 2 and that are associated with the determined display items (S122 to S125: vehicle situation acquisition means). Herein, the control unit 41 identifies pieces of vehicle situation information associated with the display items that are determined to be shown in the top page 100 (S122). The control unit 41 then transmits request information, which requests the associated vehicle 2 for the pieces of identified vehicle situation information, via the service center 5 over the external communication means 3 (S123). The control unit 41 then enters a waiting state for receiving of the pieces of requested vehicle situation information (S124).

Figure 6:
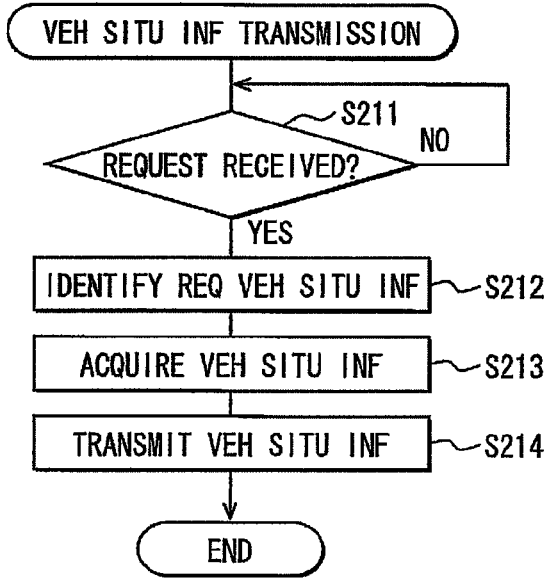
FIG. 6 is a flowchart describing the flow of vehicle situation information transmission processing to be executed in an associated vehicle.

By the way, as shown in FIG. 6, if the associated vehicle 2 receives the request information via the service center 5 over the external communication means 3 (Yes at S211), the associated vehicle 2 identifies the pieces of requested vehicle situation information (S212), acquires the pieces of identified vehicle situation information from the associated detection units 21 to 28 or pieces of other onboard equipment (the control units 71 to 74 of the pieces of onboard equipment) (S213), and transmits the pieces of acquired vehicle situation information to the portable equipment 4, which is a request source, via the service center 5 over the external communication means 3 (S214).

If the control unit 41 receives the pieces of requested vehicle situation information (Yes at S125), the control unit 41 in the present embodiment determines the priorities of the display items, which are determined to be shown in the top page 100, on the basis of the pieces of acquired vehicle situation information associated with the display items (S126). After the priorities are determined, the control unit 41 determines the contents of display, which are shown in the top page 100, so that the pieces of information on the picked up display items can be shown in the form of allowing the determined priorities to be discerned (S127). The control unit 41 then displays the top page 100 on the screen 420 of the display unit 42 (S128: page display control means).

Now, a method of determining priorities of picked up display items will be described below. In the present embodiment, in the memory unit 44, as shown in, for example, FIG. 12 and FIG. 13, display priorities are determined for various situations represented by pieces of vehicle situation information associated with respective display items. In FIG. 12 and FIG. 13, the larger a numerical value representing a display priority is, the lower the display priority is. The smaller the numerical value is, the higher the display priority is. When pieces of vehicle situation information associated with display items are acquired, the display priorities of the display items are identified based on the pieces of acquired vehicle situation information. The priorities of the display items are determined so that the display items whose identified display priorities are high (display items indicated with smaller numerical values representing display priorities) can rank higher.

Now, the aforesaid display item determination processing in the present embodiment will be described below in conjunction with FIG. 7 to FIG. 10.

First, the control unit 41 acquires current positional information, which represents the current position of the associated vehicle 2, from the associated vehicle 2 (S1: positional information acquisition means). More particularly, the control unit 41 transmits request information, which requests current positional information on the associated vehicle 2, from the communication unit 5 via the service center 5 over the external communication means 3. In the associated vehicle 2, when the communication device receives the request information, the control unit 20 requests the control unit 91 of the navigation device 90 for the current positional information. The control unit 91 in turn acquires the current positional information from the position detector 92, and transmits the current positional information to the control unit 20. The current positional information may be acquired from the position detection unit 28. The control unit 20 transmits the current positional information from the communication device 80 to the portable equipment 4, which is a request source, via the service center 5 over the external communication means 3. The control unit 41 acquires the current positional information received by the communication unit 45.

Thereafter, the control unit 41 acquires current positional information, which represents the current position of the portable equipment 4, from the position detector 46 (S2: positional information acquisition means). More particularly, the control unit 41 acquires detection information of the position detector 46, and acquires the current positional information on the portable equipment 4 on the basis of the detection information.

Thereafter, the control unit 41 decides based on the contents of storage in the memory unit 44 whether the position of the associated vehicle 2 identified based on the acquired current positional information on the associated vehicle 2 lies within any of one or more predetermined vehicle areas stored in the memory unit 44 (S3, S4, S5, S6, etc.).

Thereafter, the control unit 41 decides based on the contents of storage in the memory unit 44 whether the position of the portable equipment 4 identified based on the acquired current positional information on the portable equipment 4 lies within any of one or more predetermined user areas stored in the memory unit 44 (S31 to S33, etc., S41 to S43, etc., S51 to S53, etc., S61 to S63, etc.).

In the memory unit 44, one or more predetermined areas are registered as position areas of either or both of the portable equipment 4 and associated vehicle 2. One or more display items out of the predetermined display items shown in the top page 100 are associated with each of the areas. After the control unit 41 identifies the position of either the portable equipment 4 or associated vehicle 2 or the positions of both of them, the control unit 41 identifies in which of the areas the position or positions are registered to be present, and picks up the display items associated with the identified area or areas according to the contents of storage in the memory unit 44 (S34 to S36, S44 to S46, S54 to S56, or S61 to S66: item selection means).

Specifically, in the memory unit 44 in the present embodiment, both predetermined vehicle areas representing areas in which the associated vehicle 2 exists and predetermined user areas representing areas in which the portable equipment 4 exists (that is, areas in which a user exists) are stored. Further, in the memory unit 44, one or more display items to be shown in the top page 100 out of the predetermined display items shown in FIG. 11 are associated with each pair of the vehicle area and user area, and the relationships of association are stored (see FIG. 15 to FIG. 17). The control unit 41 identifies the pair of the vehicle area in which the associated vehicle 2 exists and the user area in which the portable equipment 4 exists, and picks up the display items associated with the identified pair according to the relationships of association stored in the memory unit 44. However, the pairs of the vehicle area and user area in the relationships of association include a pair whose vehicle area is not identified and a pair whose user area is not identified. The display items are associated with such a pair.

To be more specific, assume that the identified position of the associated vehicle 2 lies in a vehicle area stored in the memory unit 44 but the identified position of the portable equipment 4 (position of a user) does not lie in a user area stored in the memory unit 44 (S44 to S46, S54 to S56, or S64 to S66). In this case, the display items associated with the vehicle area are picked up as the display items of pieces of information to be shown in the top page 100. If the identified position of the associated vehicle 2 does not lie in a vehicle area stored in the memory unit 44 but the identified position of the portable equipment 4 lies in a user area stored in the memory unit 44 (S35, S36), the display items associated with the user area are picked up as the display items of pieces of information to be shown in the top page 100. If the identified position of the associated vehicle 2 lies in a vehicle area stored in the memory unit 44 and the identified position of the portable equipment 4 lies in a user area stored in the memory unit 44, the display items associated with both the vehicle area and user area are picked up as the display items of pieces of information to be shown in the top page 100, but the display items associated with one of the vehicle area and user area are not picked up (S34).

However, in the present embodiment, if the identified position of the associated vehicle 2 does not lie in a vehicle area stored in the memory unit 44 (No at S3), whether the distance of the associated vehicle 2 from an own home is a far distance that is equal to or larger than a predetermined distance is decided based on the identified position of the associated vehicle 2 and the identified position of the portable equipment 4 (S30). As long as a decision is made that the distance is not a far distance, whether the position of the portable equipment 4 lies in a user area stored in the memory unit 44 is decided (S31). In contrast, if a decision is made that the distance is a far distance, a decision can be made that a user has been to a known place in the vicinity of the own home. Therefore, an area in which the portable equipment (user) exists is regarded as a relatively wide area such as a neighboring area (which may include any other registered area) other than the own home, office, or predetermined shop. The display items associated with the area shall be picked up (S37).

In the present embodiment, with the pair of a vehicle area and user area, among the predetermined display items, one or more display items to be shown in the top page 100 are, as shown in FIG. 15 to FIG. 17, associated. In other words, this means that the display items, which are not shown in the top page, out of the predetermined display items are associated with the pair.

In the memory unit 44, the relationships of association between the predetermined display items to be shown in the top page 100 like those specified in FIG. 11 and pieces of vehicle situation information which the control unit 41 requests the associated vehicle 2 to acquire when the display items are picked up are stored. When the control unit 41 requests pieces of vehicle situation information (S123), the control unit determines the pieces of vehicle situation information, which the associated vehicle 2 is requested for, according to the picked up display items in line with the relationships of association (S122).

The display item of remote charge in FIG. 11 is a display item enabling a remote operation of remotely executing charge of an onboard battery for the associated vehicle 2. If showing the display item in the top page is determined, detection information (battery energy level information) of the battery energy level detection unit 21 that detects the battery energy level of the associated vehicle 2, and detection information (power supply connection information) of the power supply connection detection unit 22, which detects the state of connection of a power plug, through which the battery is charged, to a power receptacle, are acquired from the associated vehicle 2 as pieces of vehicle situation information. Herein, the display priority of the display item is, as specified in FIG. 12, determined to get higher as the battery energy level is lower. However, when the state of non-connection to the power receptacle is detected, a charging operation is disabled. Therefore, the display priority is forcibly lowered irrespective of the battery energy level.

The display item of pre-air conditioning in FIG. 11 is a display item enabling a remote operation of remotely executing start of a vehicle air conditioner for the associated vehicle 2. If showing the display item in the top page 100 is determined, detection information (interior temperature information) of the interior temperature detection unit 23 that detects the interior temperature of the associated vehicle 2 is acquired from the associated vehicle 2 as vehicle situation information. The display priority of the display item is, as specified in FIG. 13, determined to remain low as long as the interior temperature falls within a range of appropriate temperatures for human beings existent in the interior of a vehicle, and to get higher as the interior temperature separates from the range of appropriate temperatures.

The display item of remote start in FIG. 11 is a display item enabling a remote operation of remotely executing engine start for the associated vehicle 2. If showing the display item in the top page 100 is determined, detection information (exterior temperature information) of the exterior temperature detection unit 24 that detects the exterior temperature around the associated vehicle 2 is acquired from the associated vehicle 2 as vehicle situation information. The display priority of the display item is determined to remain low as long as the exterior temperature falls within the range of appropriate temperatures for engine start, and to get higher as the exterior temperature separates from the range of appropriate temperatures.

The display item of remote door opening/closing in FIG. 11 is a display item enabling a remote operation of remotely executing opening or closing of doors for the associated vehicle 2. If showing the display item in the top page 100 is determined, detection information (door opening/closing information) of the door open/closed state detection unit 25 that detects the open or closed state of the doors including the states of door locks of the associated vehicle 2 is acquired from the associated vehicle 2 as vehicle situation information. Herein, as the vehicle situation information, the distance between the associated vehicle 2 and portable equipment 4 is also acquired. The distance shall be calculated based on the pieces of current positional information on the associated vehicle 2 and portable equipment 4 which are acquired in advance (S1 and 52). The display priority of the display item is determined so that: when the doors are unlocked, the display priority gets higher as the distance between the associated vehicle 2 and portable equipment 4 becomes farther; and when the doors are locked, the display priority gets higher as the distance between the associated vehicle 2 and portable equipment 4 becomes nearer.

The display item of vehicle position grasp in FIG. 11 is a display item allowing the positional relationship between the associated vehicle 2 and portable equipment 4 to be displayed on the screen 420 of the display unit 42. If showing the display item in the top page 100 is determined, pieces of current positional information on the associated vehicle 2 and portable equipment 4 and a distance from the associated vehicle 2 to the portable equipment 4, which is calculated based on the pieces of current positional information, are acquired as pieces of vehicle situation information. However, the pieces of current positional information on the associated vehicle 2 and portable equipment 4 are acquired in advance (S1 and S2) but are not newly acquired. The display priority of the display item is determined so that: when the distance is farther than a predefined reference distance (for example, 1 km), since showing the display item is unnecessary, the display priority is lower; and when the distance falls below the reference distance, since showing the display item may be needed, the display priority is higher.

The display item of vehicle moving range monitoring in FIG. 11 is a display item enabling display on the screen 420 of the display unit 42 of whether a moving history of the associated vehicle 2 goes out of a predesignated moving range. The control unit 20 or the control unit 91 of the navigation device 90 implements a vehicle-moving range monitoring feature. By implementing the feature, the moving range is designated by a user, and positional information is acquired from the position detection unit 92 or position detection unit 29 at predetermined intervals, and then recorded. If showing the display item of vehicle moving range monitoring in the top page 100 is determined, area deviation history information including the moving range and the periodically recorded pieces of positional information is acquired from the associated vehicle 2 as vehicle situation information. The display priority of the display item is determined so that when the acquired pieces of positional information are deviated from the acquired moving range, the display priority is higher.

The display item of diagnosis in FIG. 11 is a display item allowing the results of self-abnormality diagnosis performed by the associated vehicle 2 itself to be displayed on the screen 420 of the display unit 42. The control unit 41 or the control unit 91 of the navigation device 90 implements a self-diagnosis feature. By implementing the feature, abnormality diagnosis of the own vehicle 2 is performed at predetermined intervals, and the results of the diagnosis are recorded in the memory unit 29. In addition, the results of the diagnosis are displayed on the screen 420 of the portable equipment 4 at predetermined timing (for example, trimonthly). If showing the display item of dialogue in the top page 100 is determined, the results of the abnormality diagnosis are acquired from the associated vehicle 2 as vehicle situation information. The display priority of the display item is determined so that: when the acquired results of the abnormality diagnosis demonstrate presence of an abnormality, the display priority gets higher; and when the timing comes, the display priority gets higher.

The display item of fuel level monitoring in FIG. 11 is a display item allowing a level of a fuel (driving fuel), with which the driving power source (engine or motor) of the associated vehicle 2 is driven, to be displayed on the screen 420 of the display unit 42. If the associated vehicle 2 is a gasoline-fueled automobile, the fuel level refers to a gasoline level. If the associated vehicle 2 is a hybrid automobile, the fuel level refers to both the gasoline level and battery energy level. If showing the display item in the top page 100 is determined, detection information (fuel level information), that is, detection information provided by either the fuel level detection unit 26 that detects the fuel level (gasoline level) of the associated vehicle 2 or the battery level detection unit 21 that detects the fuel level (battery energy level) of the associated vehicle 2 is acquired as vehicle situation information from the associated vehicle 2 according to the type of fuel (driving fuel) of the associated vehicle 2. The display priority of the display item is determined so that: as the fuel level is lower, the display item gets lower; and as the fuel level is higher, the display item gets higher.

The display item of vehicle lock-on monitoring in FIG. 11 is a display item allowing a moving path of the associated vehicle 2 to be displayed on the screen 420 of the display unit 42 so that when the associated vehicle 2 has gotten stolen, the moving path of the associated vehicle can be locked on based on the positional information on the associated vehicle 2. In the present embodiment, similarly to the vehicle moving range monitoring feature, the positional information on the associated vehicle 2 is recorded in the memory unit 29 at predetermined intervals, and the moving path of the associated vehicle 2 is inferred from the pieces of positional information. The moving path is then displayed on the screen 420 of the portable equipment 4. If showing the display item of vehicle lock-on monitoring in the top page 100 is determined, stealing situation information on the associated vehicle 2 is acquired from the service center 5 as vehicle situation information. The stealing situation information is recorded in the service center 5. When the associated vehicle 2 has gotten stolen, if the theft is reported to the police, the police side notifies the service center 5 of the fact that the associated vehicle has gotten stolen. The stealing situation information in the service center 5 is updated to stolen. The display priority of the display item is determined so that when the associated vehicle has gotten stolen, the display priority gets higher.

FIG. 14 to FIG. 17 show the relationships of association between the situations (#00 to #33) of the associated vehicle 2 and portable equipment 4, which are identified through the pieces of processing described in FIG. 7 to FIG. 10, and one or more display items (item group) shown in the top page. What are referred to as the situations are situations determined based on an area where the associated vehicle 2 exists, and an area where the portable equipment 4 exists. For example, assuming that both the associated vehicle 2 and portable equipment 4 exist in the user's home, the user is inferred to be at home. Assuming that the associated vehicle 2 exists in the user's home and the portable equipment 4 exists in a registered area such as an office (workplace or the like), the user is inferred to be out on business or be traveling. Assuming that the associated vehicle 2 exists in the registered area and the portable equipment 4 exists in the user's home, the portable equipment is inferred to be in use by a family member or another user. Assuming that the associated vehicle 2 exists neither in the registered area nor in the vicinity of the user's home and the portable equipment 4 exists in the user's home, the family is inferred to be traveling. Various situations can be inferred from pairs of the positions of the associated vehicle 2 and portable equipment 4. Therefore, when the pairs are associated with display items effective in the situations, it would be found user-friendly.

Noted is that the situations include a case where an area where either the associated vehicle 2 or portable equipment 4 exists or areas where both of them exist are uncertain, that is, a case where either or both of the associated vehicle 2 and portable equipment 4 do not exist in any registered area.

The relationships of association are stored in the memory unit 44. In the present embodiment, once the situation is identified through the pieces of processing mentioned in FIG. 7 to FIG. 10, display items to be shown in the top page 100 are determined according to the stored relationships of association.

Figure 19:
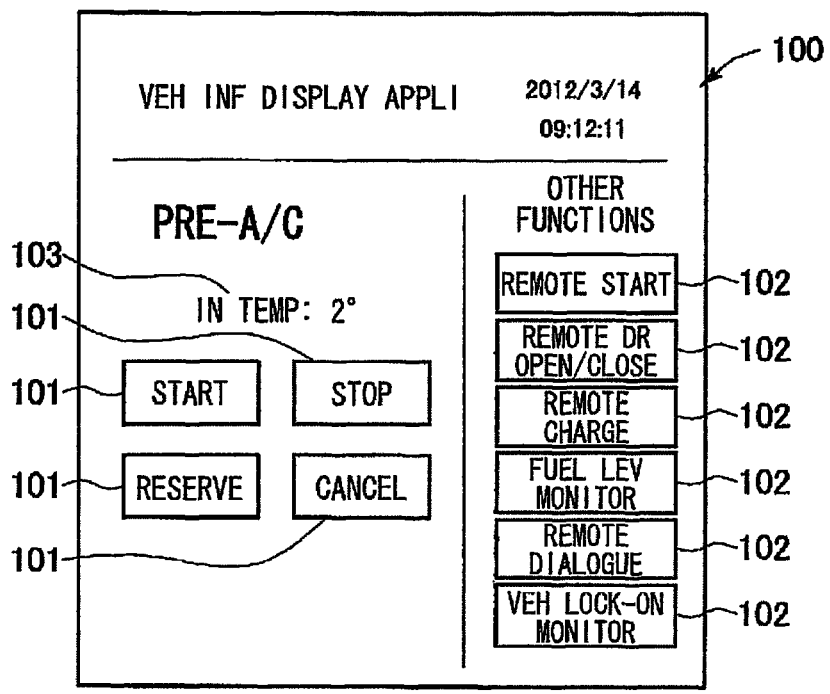
FIG. 19 is a diagram showing a second display example of the top page out of the associated vehicle pages to be displayed on the screen of the portable equipment.

In the present embodiment, the predetermined display items to be shown in the top page 100 are, as specified in FIG. 11, associated with remote operation items enabling remote operation features to be implemented in the associated vehicle 2. In the present embodiment, for example, as shown in FIG. 19, when a predetermined manipulative entry is made on any of pieces of information (herein, pieces of information 101) on the remote operation items, which are shown in the top page 100, at the operating unit 43, the remote operation feature associated with the remote operation item is implemented in the associated vehicle 2.

Figure 18:
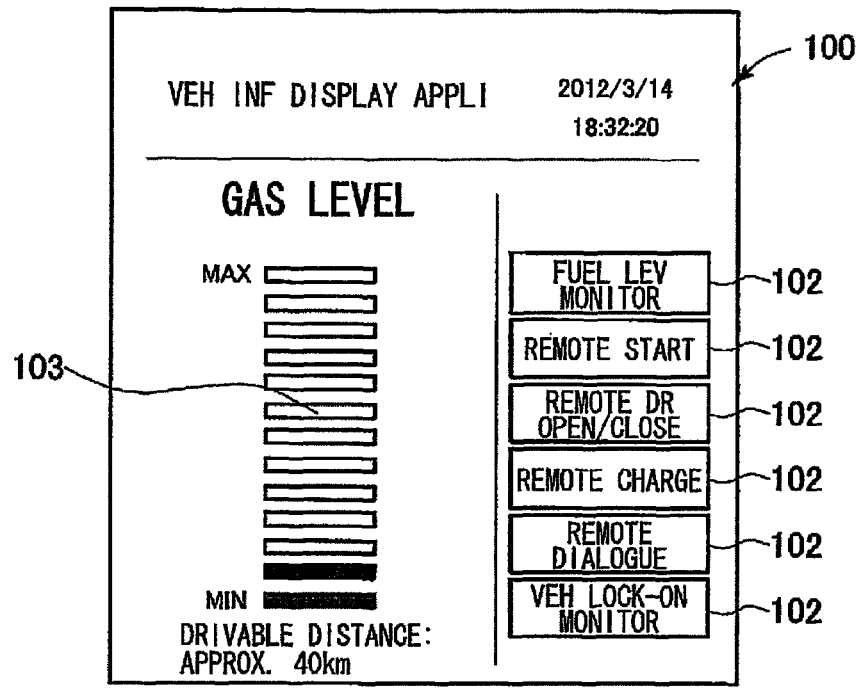
FIG. 18 is a diagram showing a first display example of a top page out of associated vehicle pages to be displayed on the screen of portable equipment.

In the present embodiment, the predetermined display items to be shown in the top page 100 are, as shown in FIG. 11, associated with pieces of vehicle situation information on the associated vehicle 2 which are acquired to be shown in the top page 100. In the present embodiment, as shown in FIG. 18, for showing vehicle situation information in the top page 100, information (herein, information 103) based on the acquired vehicle situation information is shown.

In the present embodiment, one or more display items are associated with a pair of a vehicle area and user area. The display items do not include an item whose information display is unnecessary in the area. For example, if the associated vehicle 2 exists in the user's home or in an office, since the position of the associated vehicle 2 is grasped, information display of the display item of vehicle position grasp or vehicle lock-on monitoring is unnecessary. Therefore, the display item of vehicle position grasp or vehicle lock-on monitoring is not associated with the pair including such an area, and is not picked up.

In the present embodiment, one or more display items are associated with a pair of a vehicle area and user area. The display items are associated with the remote operation items. The remote operation items associated with the display items do not include a remote operation item enabling implementation of a remote operation feature whose use when the portable equipment 4 and associated vehicle 2 exist in the areas identical to those of the pair is unnecessary, implementation of a remote operation feature whose use is impossible (for example, physically impossible), or implementation of a remote operation feature whose use is inhibited (for example, legally inhibited or inhibited under the agreements reached in the office). For example, if the position of the associated vehicle 2 belongs to an area devoid of a charging facility, remote charge is physically impossible. Therefore, the display item of remote charge is not associated with the pair including the area, and is not picked up. If the position of the associated vehicle 2 belongs to an area in which remote door opening/closing of a vehicle is legally inhibited, the display item of remote door opening/closing is not associated with the pair including the area, and is not picked up.

Determination processing of display items for a concrete display example of the top page 100 in the present embodiment will be described in conjunction with FIG. 18 to FIG. 20.

Among the display items picked up to be shown in the top page 100, a display item of a top priority (top-priority item) is identified based on pieces of vehicle situation information associated with the acquired display items. Information on the display item of the top priority is shown while being most greatly highlighted. The pieces of vehicle situation information acquired when the display items are picked up may be shown simultaneously.

FIG. 18 shows an example of the top page 100. Information on a display item of a top priority (fuel level monitoring) is shown while being most greatly highlighted. Herein, as the information on the display item shown while being most greatly highlighted, vehicle situation information (fuel level information) associated with the display item is displayed on the screen 420.

FIG. 19 shows an example of the top page 100, or an example of a screen image displayed in a situation specified in FIG. 16. In the top page 100, information on a display item of a top priority is most greatly highlighted. Herein, the most greatly highlighted display item is a display item of pre-air conditioning enabling a predetermined remote operation feature (pre-air conditioning feature) to be implemented in the associated vehicle 2. As the information on a remote operation item, operation buttons 101 for implementing the remote operation feature in the associated vehicle 2 are displayed. When any of the operation buttons 101 is selected by performing a selecting manipulation at the operating unit 43, an associated control is implemented in the associated vehicle 2.

In FIG. 18 and FIG. 19, display items 102 other than a display item of a top priority are shown in the top page 100 in such a manner that the determined priorities can be discerned (herein, listed on the right side, and the upper display items are given higher priorities). The display items 102 are listed, and shown as page shift buttons. By performing a selecting manipulation at the operating unit 43, the contents of display on the screen 420 are switched to display of any of the display items 102 or a page through which a remote operation can be executed.

In FIG. 19, information 103 (interior temperature) representing vehicle situation information associated with the display item is shown in the top page 100.

Figure 20:
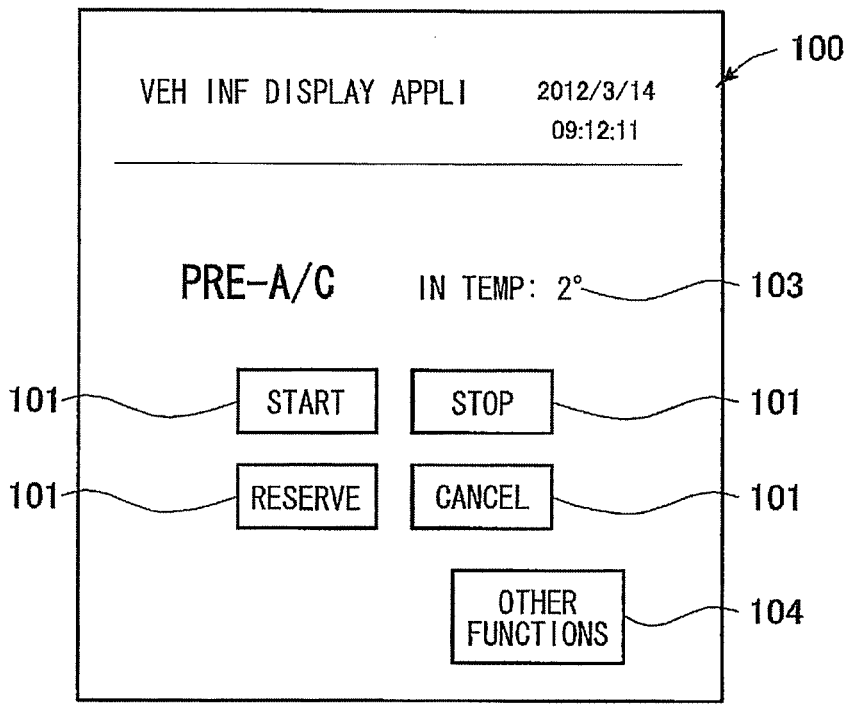
FIG. 20 is a diagram showing a third display example of the top page out of the associated vehicle pages to be displayed on the screen of the portable equipment.

FIG. 20 shows an example of the top page 100. Information on a display item of a top priority is most greatly highlighted. Unlike FIG. 17, display items other than the display item are not shown. Unless an operation button 104 is selected at the operating unit 43 in order to perform page shift, pieces of information on the other display items are not shown.

Figure 21:
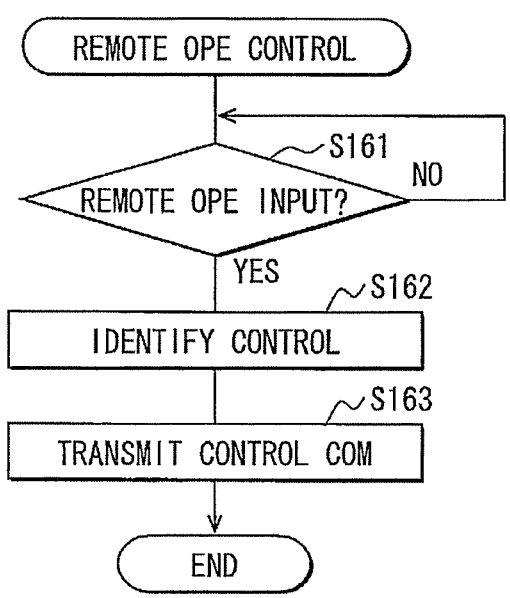
FIG. 21 is a flowchart describing the flow of remote operation control to be implemented in portable equipment.
Figure 22:
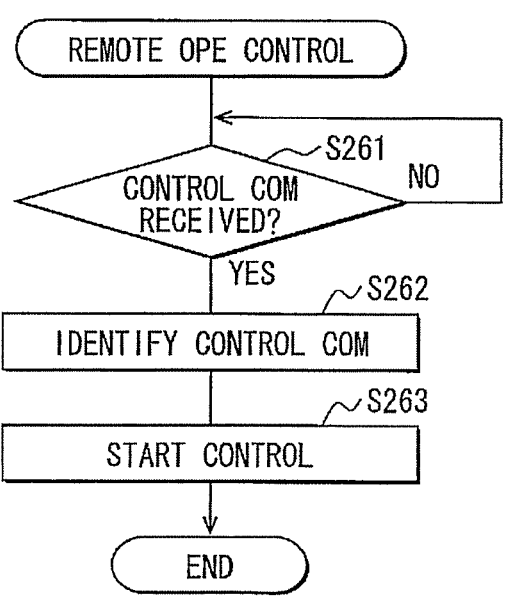
FIG. 22 is a flowchart describing the flow of remote operation control to be implemented in an associated vehicle.

Remote operation control for implementing a remote operation feature in the associated vehicle 2 will be described in conjunction with FIG. 21 and FIG. 22.

In the top page 100 displayed on the screen 420 or any other page displayed after the display of the top page 100, when a manipulative entry for executing a remote operation is made at the operating unit 43, if the control unit 41 accepts the manipulative entry (Yes at S161), a control associated with the accepted manipulative entry is identified (S162). A control command allowing the associated vehicle 2 to implement the identified control is transmitted from the communication unit 45 to the associated vehicle 2 via the service center 5 over the external communication means 3. In the associated vehicle 2, when the communication device 80 receives the control command (Yes at S261), the control unit 20 identifies the control on the basis of the received control command (S262), outputs the control command to a controlling entity that implements the control, and thus initiates the control (S263). For example, if the control represented by the control command is execution of pre-air conditioning, the control unit 20 controls a pre-air conditioning feature of the associated vehicle 2. For example, the control unit 20 transmits a control command that instructs the ECU 71 to perform air conditioning, and allows the ECU 71 to execute air conditioning for a predetermined period of time.

An embodiment has been described so far. The embodiment is a mere example. For example, any of components of the embodiment may be omitted or another component may be added. Anyhow, various modifications can be made based on the knowledge of a person with ordinary skill. The same applies to embodiments to be described below.

Embodiments different from the aforesaid embodiment will be described below. However, common components will be assigned the same reference numerals, and an iterative description will be omitted.

Second Embodiment

Figure 1B:
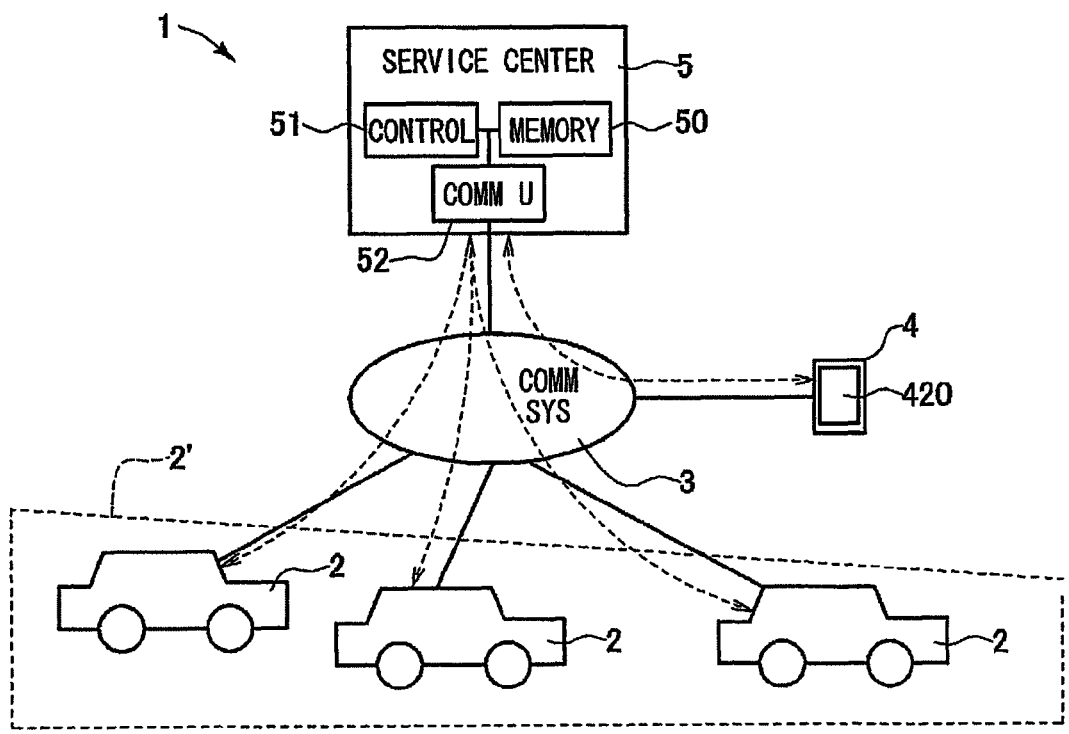
FIG. 1B is a block diagram schematically showing the configuration of a vehicle information display system that utilizes portable equipment of second or third embodiment.

In the first embodiment, as shown in FIG. 1A, one associated vehicle 2 is associated with one piece of portable equipment 4. As shown in FIG. 1B, plural associated vehicles 2 may be associated with the one piece of portable equipment 4. For example, an owner of the plural vehicles 2 carries the one piece of portable equipment 4.

An example of the second embodiment will be described below.

To begin with, display processing for associated vehicle pages 100 will be described. The processing is identical to the one described in FIG. 4 relating to the first embodiment. However, the display processing for the top page 100 at S106 is different. Interlocked with the processing, the control unit 51 of the service center 5 executes processing described in FIG. 16. S511 to S514 are identical to S501 to S504 described in FIG. 24 relating to the first embodiment, but subsequent processing is different.

Display processing (S106) for the top page 100 in the present embodiment will be described in conjunction with FIG. 25 and FIG. 26.

When display processing for the top page 100 of S106 is initiated, the control unit 41 of the portable equipment 4 enters a wait state for receiving associated vehicle group information that represents an associated vehicle group 2' which are candidates for information display to be shown in associated vehicle pages (S131). The service center 5 has the relationships of association between a user and the associated vehicle group 2, which refer to master information, stored in the memory unit 50. If authenticity is established through immediately preceding authentication processing (Yes at S515), the control unit 51 references the stored information on the relationships of association, identifies the associated vehicle group 2, which includes plural associated vehicles 2 associated with the portable equipment 4 that is a transmission source, on the basis of user authentication information which represents the established authenticity (S516), and transmits associated vehicle group information, which represents the associated vehicles 2 belonging to the associated vehicle group 2', to the portable equipment 4, which is the transmission source, over the external communication means 3 (S517).

When the control unit 41 of the portable equipment 4 receives the associated vehicle group information (Yes at S132), the control unit 41 identifies the associated vehicle group 2', one of which becomes a candidate for information display to be shown in the associated vehicle pages, on the basis of the received associated vehicle group information (S133). The control unit 41 then accepts a predetermined vehicle selecting manipulation of selecting the associated vehicle 2, which becomes a candidate for information display to be shown in the associated vehicle pages, as a display candidate vehicle (S134, S135: vehicle selecting manipulation acceptance means). More particularly, the control unit 41 displays on the screen 420 of the display unit 42 an associated vehicle selection page 190 in which pieces of information 191 that represent the plural associated vehicles 2 belonging to the identified associated vehicle group 2' are listed (S134), and accepts a vehicle selecting manipulation of selecting the display candidate vehicle from among the listed associated vehicles 2 (S135). The control unit 41 identifies the associated vehicle 2, which is selected from among the listed associated vehicles 2, as the display candidate vehicle according to the accepted vehicle selecting manipulation (S137).

Figure 27:
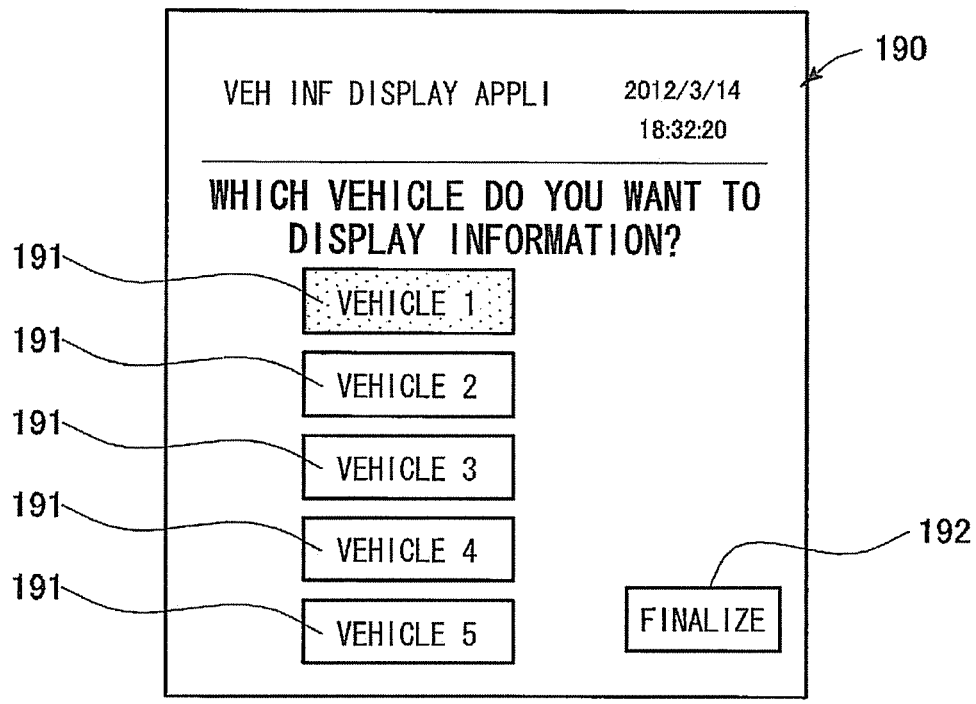
FIG. 27 is a diagram showing a first display example of an associated vehicle selection page to be displayed on the screen of portable equipment.

Herein, the associated vehicle selection page 190 has, as shown in FIG. 27, selection buttons 191, which are associated with the associated vehicles, as the pieces of information 191 representing the associated vehicles that belong to the associated vehicle group 2; listed. The selection buttons 191 are shown in such a manner that one of the buttons can be selected (S134). Along with the display, accepting the vehicle selecting manipulation is initiated (S135). As the vehicle selecting manipulation, a series of manipulations, that is, a selecting manipulation of selecting any of the selection buttons 101 and a finalizing manipulation of manipulating a finalization button 192 with the selection button selected is accepted (Yes at S136). Thus, the associated vehicle 2 associated with the selected selection button 191 is selected and finalized as a display candidate vehicle (S137).

The control unit 41 then transmits a result of selection and finalization (display candidate vehicle information representing a selected and finalized display candidate vehicle 2) to the service center (terminal equipment) 5 over the external communication means 3 (S138). In the service center 5, after associated vehicle group information is transmitted (S517), receiving the result of selection and finalization of the associated vehicle 2 (display candidate vehicle information) from the portable equipment 4 whose authenticity has been established, is waited (S518). On receipt of the result of selection and finalization (display candidate vehicle information) (Yes at S519), the control unit 41 relays an information request, which is transmitted to the associated vehicle 2 that is selected and finalized by a user and represented by the result of selection and finalization, and pieces of information that are transmitted from the associated vehicle 2, which is selected by the user, to the portable equipment 4, which is a request source, in response to the request.

Thereafter, the control unit 41 determines display items (items) to be shown in the top page 100 (S139: item selection means). The determination method is identical to that in the first embodiment. Once the display items are picked up and determined, the control unit 41 acquires the positional information on either the portable equipment 4 or the display candidate vehicle 2 or the pieces of positional information on both of them in the same manner as that in the first embodiment (S141 to S143: positional information acquisition means). Based on the positional information or the pieces of positional information, the position of either the portable equipment 4 or the display candidate vehicle 2 for the portable equipment 4 or the positions of both of them are identified. Based on areas to which the positions belong, items of pieces of information to be shown in the top page 100 are picked up from among plural predetermined items (S144: item selection means). The control unit 41 determines the contents of display to be shown in the top page 100 in the same manner as that in the first embodiment, so that information on the display candidate vehicle 2 for the portable equipment 4 out of the pieces of information on the picked up items can be shown (S145). The top page 100 is then displayed on the screen 420 of the display unit 42 (S146: page display control means).

Now, variants of the second embedment will be described below.

Figure 25:
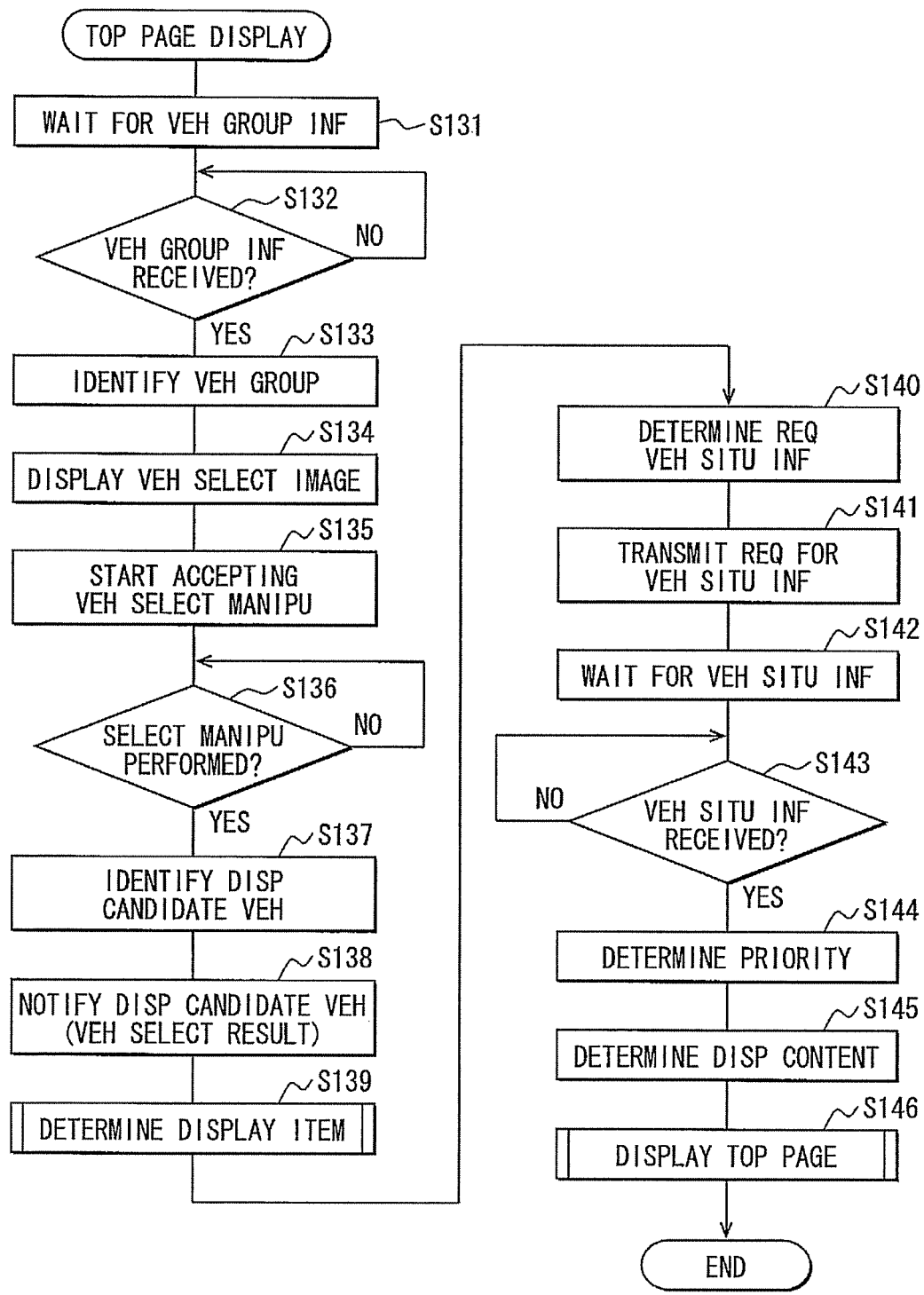
FIG. 25 is the second example of the flowchart describing the flow of top page display processing.

As for listing the associated vehicles 2, which belong to the associated vehicle group 2, mentioned in FIG. 25 (S134), the associated vehicles 2 may be listed according to display priorities under a predetermined condition, such as, in ascending order by timing at which each of the associated vehicles 2 belonging to the associated vehicle group 2' is employed or in descending order by use frequency. The condition may be able to be designated from among plural conditions or be changed from one to another.

To be more specific, a memory area in which pieces of previous use information on the plural associated vehicles 2 belonging to the associated vehicle group 2' associated with the portable equipment 4 (including previous situations of selection of the associated vehicles made by performing the vehicle selecting manipulation) are stored is defined in the memory unit 44 of the portable equipment 4. The control unit 41 stores operations, which are performed on the plural associated vehicles 2 belonging to the associated vehicle group 2' using the portable equipment 4, as pieces of previous use information. That is to say, before or after the top page 100 is displayed, if the associated vehicles 2 are operated by performing the aforesaid vehicle selecting manipulation or reading manipulation (by making a manipulative entry for implementing each operation feature), the operations are classified and stored as pieces of previous use information. The control unit 41 determines a listing order on the basis of the contents of storage, and accepts the vehicle selecting manipulation of selecting the display candidate vehicle 2 from among the associated vehicles 2 listed in the top page 100 according to the listing order (vehicle selecting manipulation acceptance means).

(First Variant)

The memory unit 44 preserves as previous use information on the associated vehicle group 2', which is stored, at least a finally used vehicle that is finally used among the associated vehicles 2 belonging to the associated vehicle group 2'. The control unit 41 (vehicle selecting manipulation acceptance means) can list and show the associated vehicles in the associated vehicle selection page 190 on the basis of the finally used vehicle stored in the memory unit 44 in such a manner that at least the finally used vehicle is ranked highest in the list.

(Second Variant)

The memory unit 44 preserves as previous use information on the associated vehicle group 2', which is stored, driving use dates of the associated vehicles 2 belonging to the associated vehicle group 2' Based on the driving use dates stored in the memory unit 44, the control unit 41 (vehicle selecting manipulation acceptance means) can list and show the associated vehicles 2 in the associated vehicle selection page 190 in such a manner that the associated vehicle 2 which has been used at the latest driving use time can be ranked highest in the list. As the driving use dates stored in the memory unit 44, when the display item of remote start is designated, if a remote operation for engine start is executed for the associated vehicle 2, the date of the operation is stored. The remote operation for door opening/closing may be substituted for the remote operation for engine start.

(Third Variant)

The memory unit 44 preserves as previous use information on the associated vehicle group 2' which is stored, driving use frequencies of the associated vehicles 2 belonging to the associated vehicle group 2'. Based on the driving use frequencies stored in the memory unit 44, the control unit 41 (vehicle selecting manipulation acceptance means) can list and show the associated vehicles in the associated vehicle selection page 190 in such a manner that the associated vehicle which has been used at a higher driving use frequency can be ranked higher in the list. As for the driving use frequencies stored in the memory unit 44, when the display item of remote start is designated, if the remote operation for engine start is executed for the associated vehicle 2, the driving use frequency of the associated vehicle for which engine start is executed is updated to be incremented. The remote operation for door opening may be substituted for the remote operation for engine start.

(Fourth Variant)

The memory unit 44 preserves as previous use information on the associated vehicle group 2', which is stored, at least a finally selected vehicle that is finally selected by performing the vehicle selecting manipulation. The control unit 41 (vehicle selecting manipulation acceptance means) can list and show the associated vehicles in the vehicle selection page 190 in such a manner that the finally selected vehicle stored in the memory unit 44 can be ranked highest in the list.

(Fifth Variant)

The memory unit 44 time-sequentially preserves as previous use information on the associated vehicle group 2', which is stored, a result of selection of an associated vehicle performed through the vehicle selecting manipulation. Based on the time-sequential results of selection stored in the memory unit 44, the control unit 41 (vehicle selecting manipulation acceptance means) can list and show the associated vehicles in the associated vehicle selection page 190 in such a manner that the associated vehicle which has been selected at a later selection time can be ranked higher in the list.

(Sixth Variant)

The memory unit 44 preserves as previous use information on the associated vehicle group 2', which is stored, selection frequencies of the associated vehicles selected through the vehicle selecting manipulation. Based on the selection frequencies of the associated vehicles stored in the memory unit 44, the control unit 41 (vehicle selecting manipulation acceptance means) can list and show the associated vehicles in the associated vehicle selection page 190 in such a manner that the associated vehicle which has been selected at a higher selection frequency can be ranked higher in the list.

Third Embodiment

Figure 28:
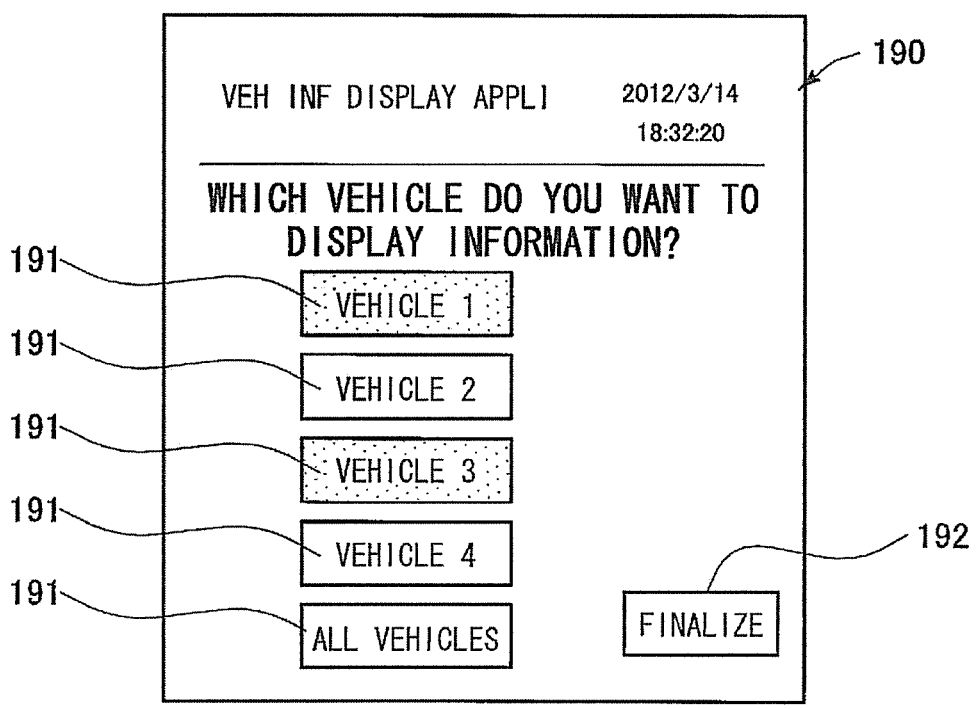
FIG. 28 is a diagram showing a second display example of the associated vehicle selection page to be displayed on the screen of the portable equipment.

In the aforesaid second embodiment, in the associated vehicle selection page 190, as shown in FIG. 27, the selection buttons 191 associated with the associated vehicles 2 belonging to the associated vehicle group 2' are listed and shown so that one of the selection buttons can be selected. Alternatively, as shown in FIG. 28, the selection buttons 191 associated with the associated vehicles 2 belonging to the associated vehicle group 2' may be listed and shown so that one or more of the selection buttons can be selected, and acceptance of a vehicle selecting manipulation may be initiated.

Figure 4:
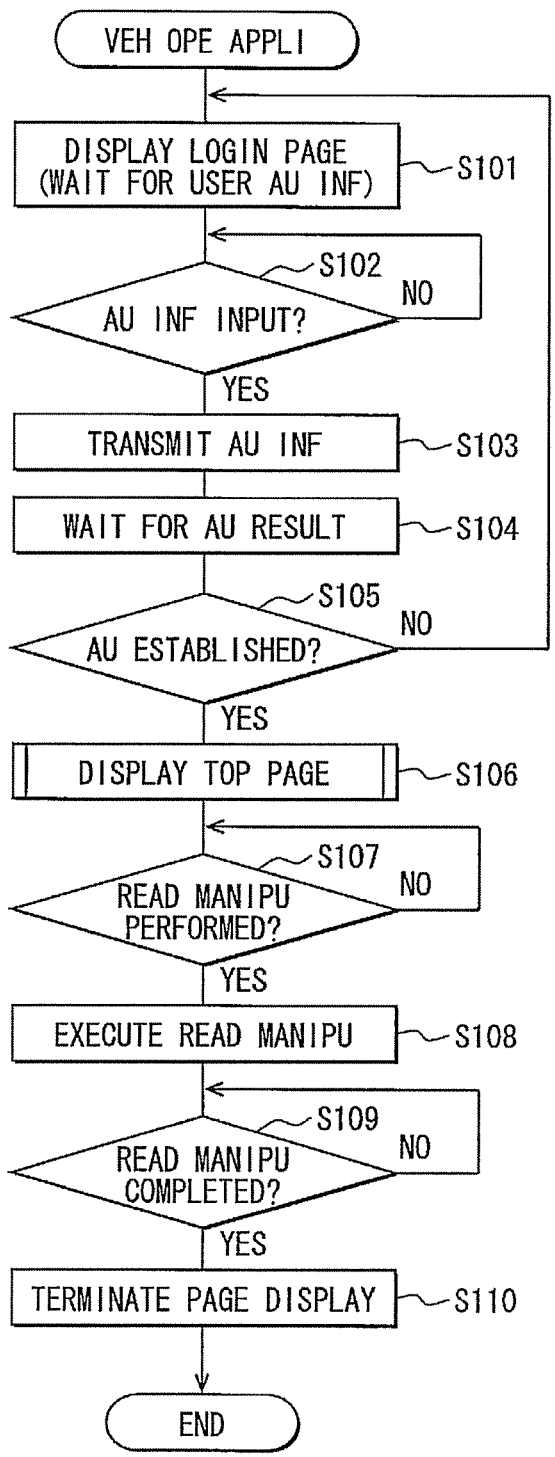
FIG. 4 is the first example of a flowchart describing the flow of processing of a vehicle operation application to be run in the portable equipment.
Figure 26:
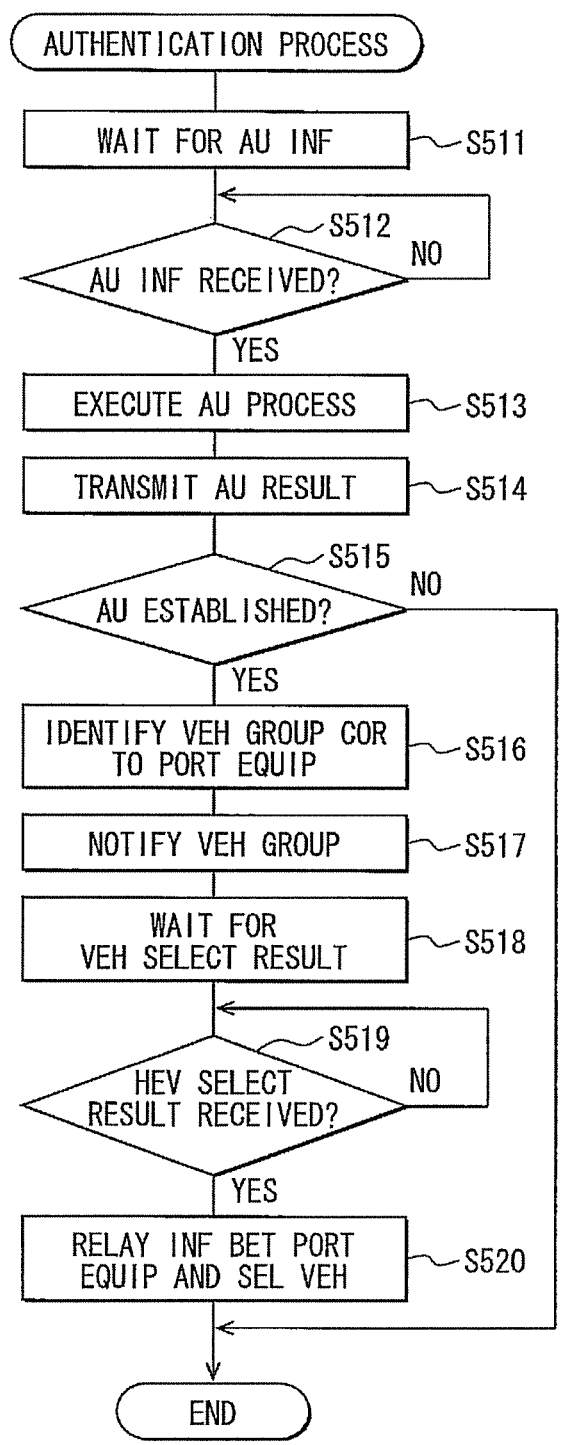
FIG. 26 is the second example of the flowchart describing the flow of authentication processing.
Figure 29:
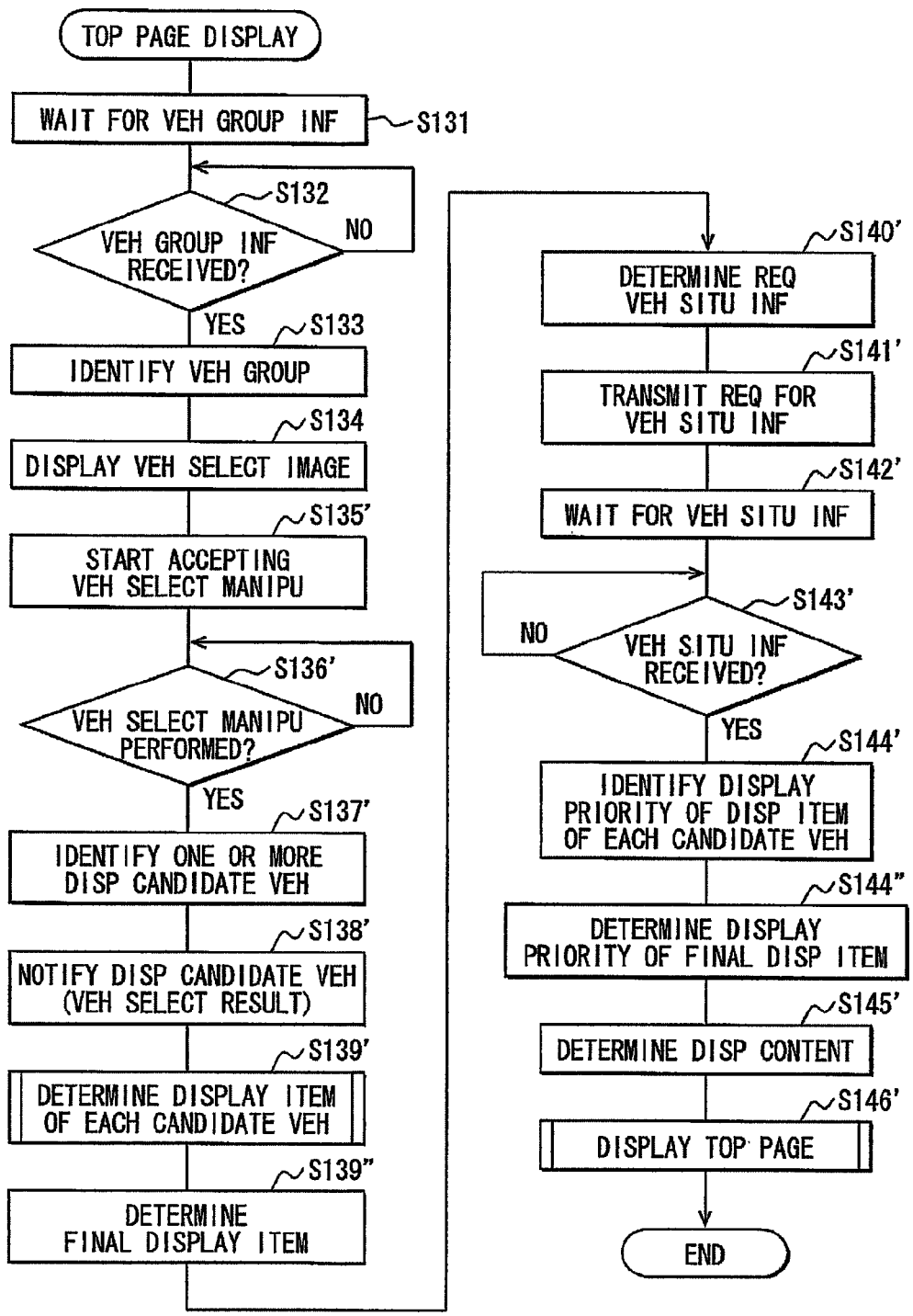
FIG. 29 is a flowchart describing the flow of top page display processing.

Even in the present embodiment, the control unit 41 of the portable equipment 4 executes the pieces of processing mentioned in FIG. 4, FIG. 29, and FIG. 26 so as to display the top page. The processing mentioned in FIG. 4 is identical to that in the first or second embodiment. The processing from S131 to S134 mentioned in FIG. 29 is identical to the processing mentioned in FIG. 25 and employed in the second embodiment. However, in the processing mentioned in FIG. 29, display of the associated vehicle selection page 190 (S135') is such that the control unit 41 can select one or more associated vehicles from among the associated vehicles 2 belonging to the associated vehicle group 2'. More particularly, the control unit 41 displays the associated vehicle selection page 190 through which after one or more selection buttons 191 are selectively manipulated as the vehicle selecting manipulation, a finalization button 192 is manipulated for finalization with the selection buttons selected, that is, through which a series of manipulations to be performed at the operating unit 43 can be accepted (Yes at S136'). The control unit 41 then selects and finalizes the associated vehicles, which are associated with the selected selection buttons 191, as display candidate vehicles (S137').

The control unit 41 then transmits the results of selection and finalization (display candidate vehicle information representing one or more display candidate vehicles that are selected and finalized) to the service center (terminal equipment) 5 over the external communication means 3 (S138'). In the service center 5, on receipt of the results of selection and finalization (display candidate vehicle information) (Yes at S519), the control unit 41 relays an information request, which is sent to the one or more display candidate vehicles 2 represented by the results of selection and finalization, and pieces of information to be sent from the display candidate vehicles 2 to the portable equipment 4, which is a request source, in response to the request.

Assuming that plural associated vehicles 2 are selected and finalized as display candidate vehicles by performing the vehicle selecting manipulation, the control unit 41 determines display items by utilizing display item determination processing mentioned in FIG. 7 to FIG. 10 (S139' and S139"). Namely, the control unit 41 executes the display item determination processing, which is mentioned in FIG. 7 to FIG. 10, for one of the display candidate vehicles 2 in the same manner as it does in the first embodiment, and determines display items for the display candidate vehicle 2 (S139'). The control unit 41 executes the processing for each of the display candidate vehicles 2 so as to determine display items for all the display candidate vehicles 2 (S139'). The control unit 41 acquires pieces of vehicle situation information associated with the determined display items for one of the display candidate vehicles 2 in the same manner as it does in the first embodiment (S140' to S143'), and identifies display priorities like those shown in FIG. 12 or FIG. 13 according to the acquired pieces of vehicle situation information (S144'). The control unit 41 executes the processing for each of the display candidate vehicles 2 so as to identify display priorities in terms of the display items determined for all the display candidate vehicles 2 (S144').

The control unit 41 picks up as final display items, which are shown in the top page 100, display items (identical display items (duplicate common display items) are regarded as one display item) from among the display items determined for all the display candidate vehicles (S139"). Further, the control unit 41 determines priorities relevant to the final display items determined for all the display candidate vehicles 2 so that the smaller numerical value (that is, a higher display priority) can represent a higher priority (S144"). At this time, numerical values of calculated display priorities relevant to the same display item are summated, and the numerical values relevant to the display items are compared with one another.

The control unit 41 determines the contents of display in the top page 100 so that: at least the display item having the highest priority can be most greatly highlighted; the determined priority can be discerned; and the pieces of information on the picked up display items can be displayed (S145'). The control unit 41 then displays the top page 100 on the screen 420 of the display unit 42 (S146': page display control means).

Figure 7:
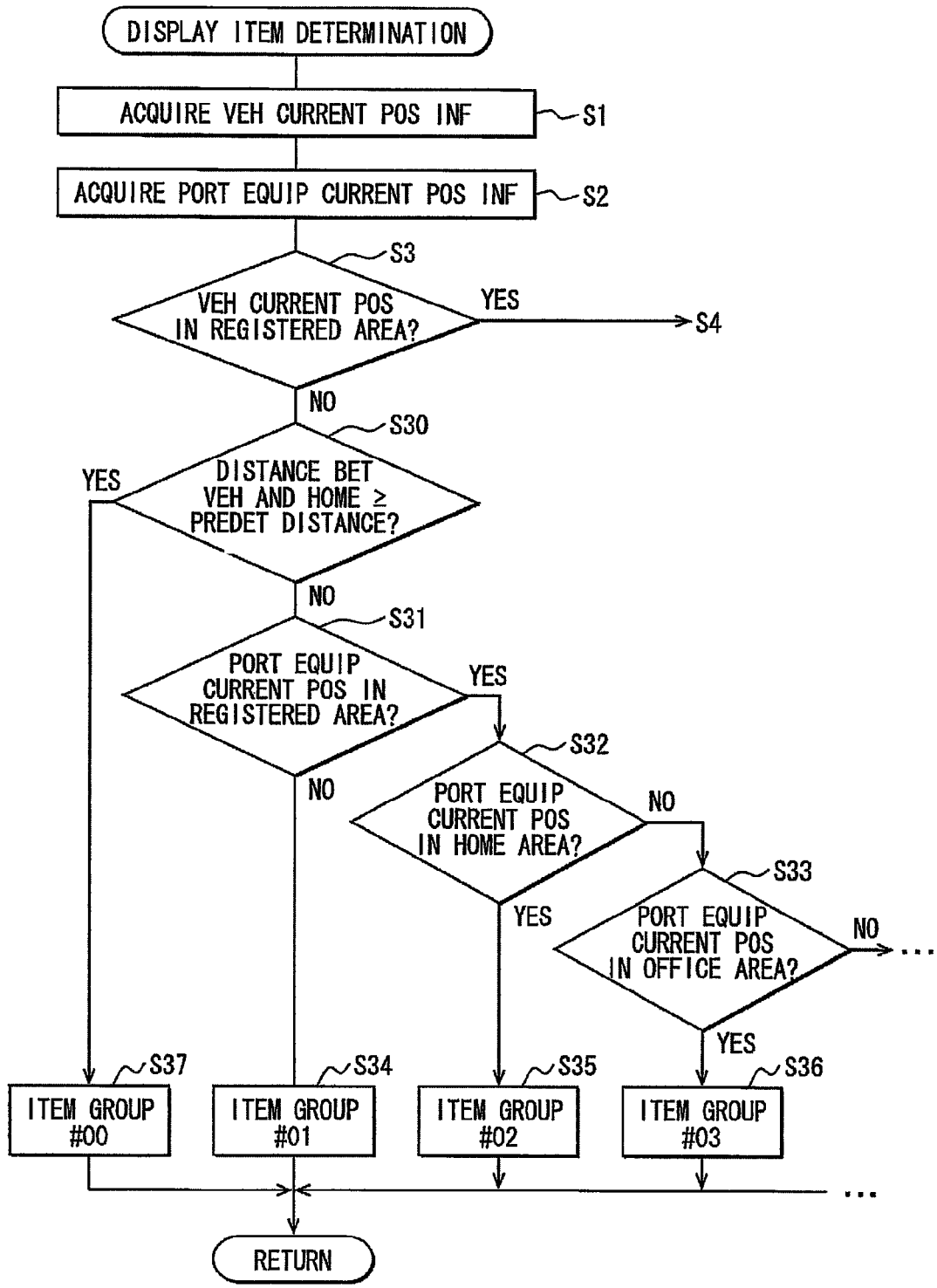
FIG. 7 is a flowchart describing the flow of display item determination processing mentioned in FIG. 5.
Figure 8:
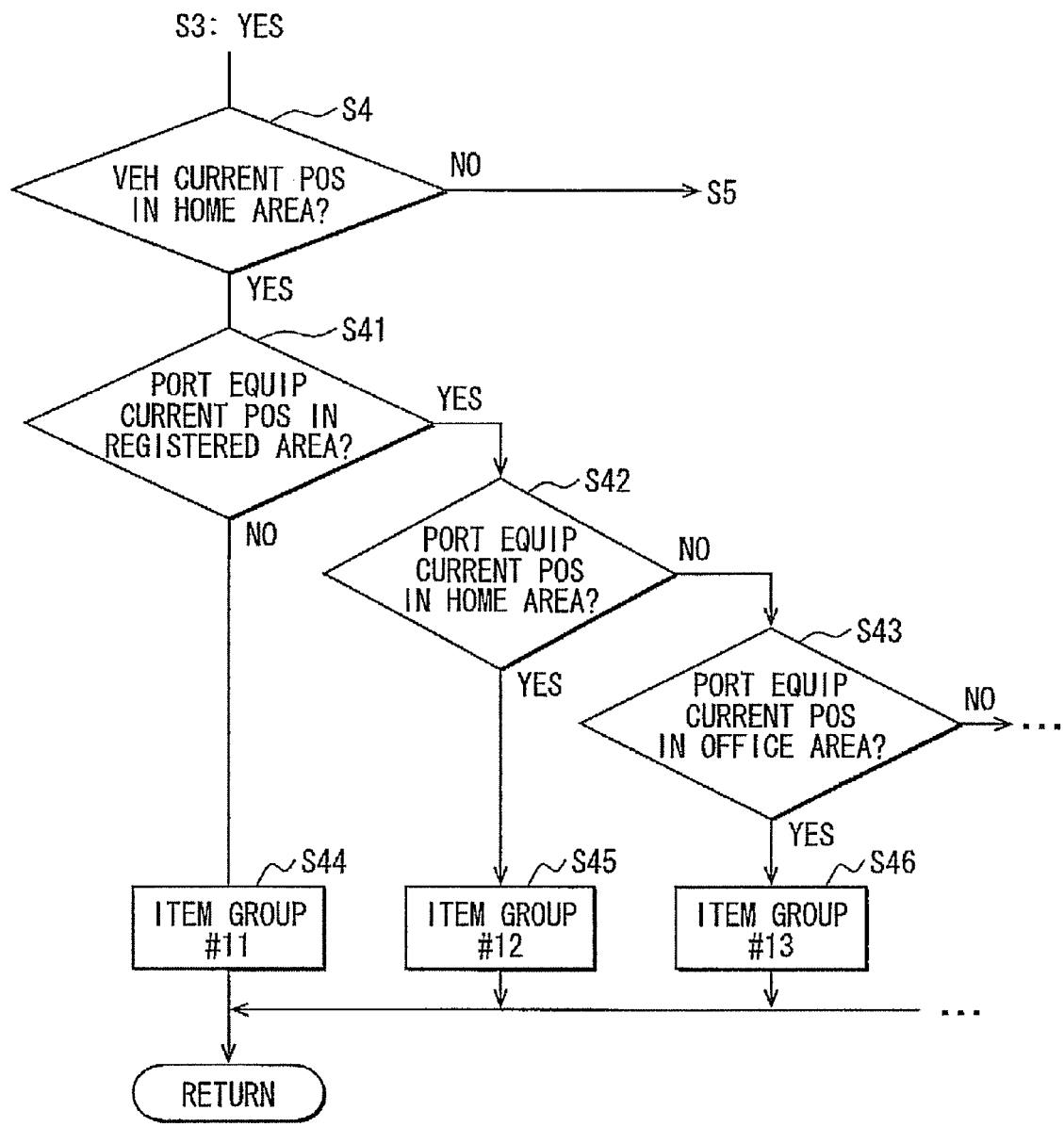
FIG. 8 is a flowchart describing the flow of processing continuing the processing mentioned in FIG. 7.
Figure 9:
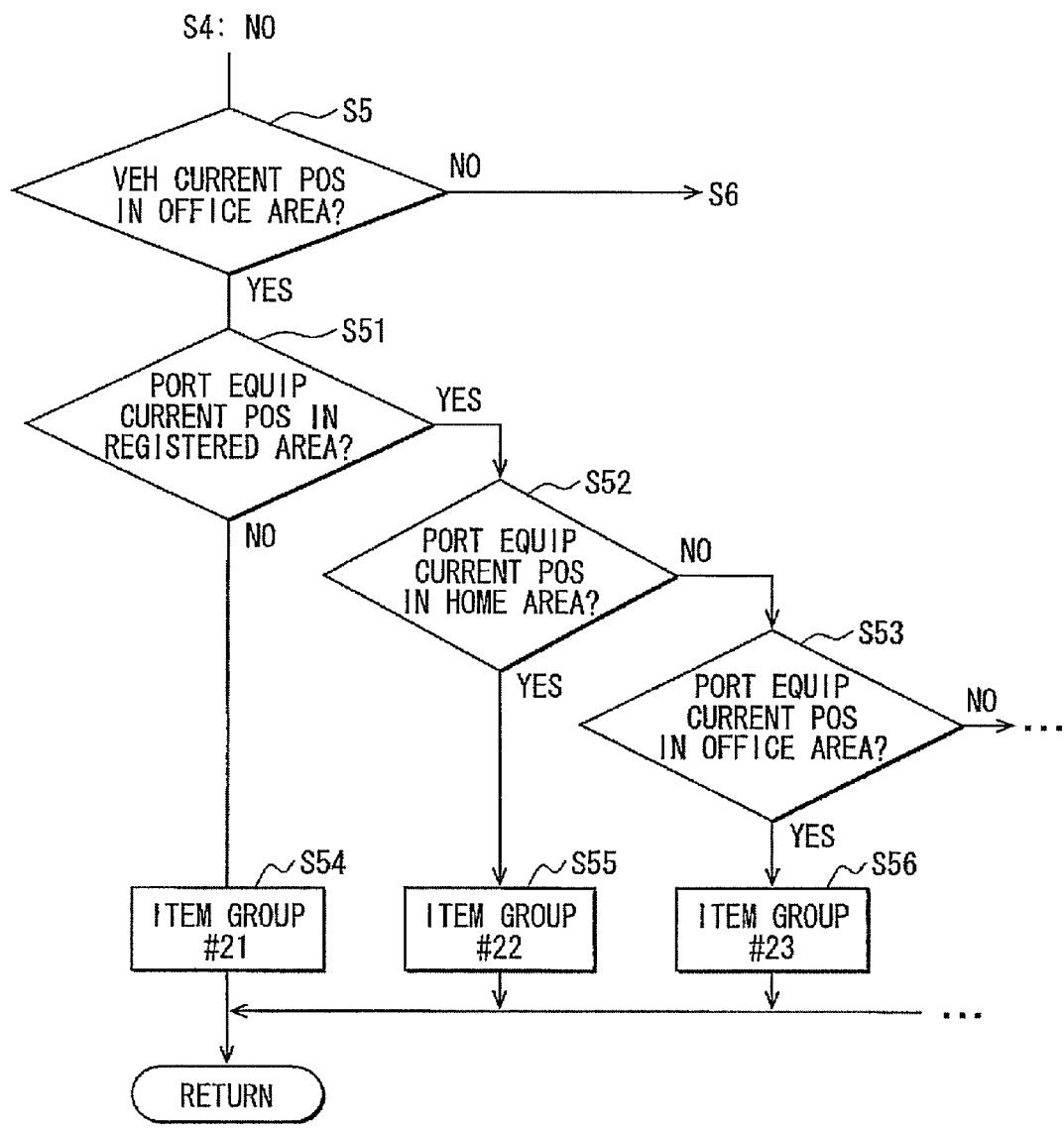
FIG. 9 is a flowchart describing the flow of processing continuing the processing mentioned in FIG. 8.
Figure 10:
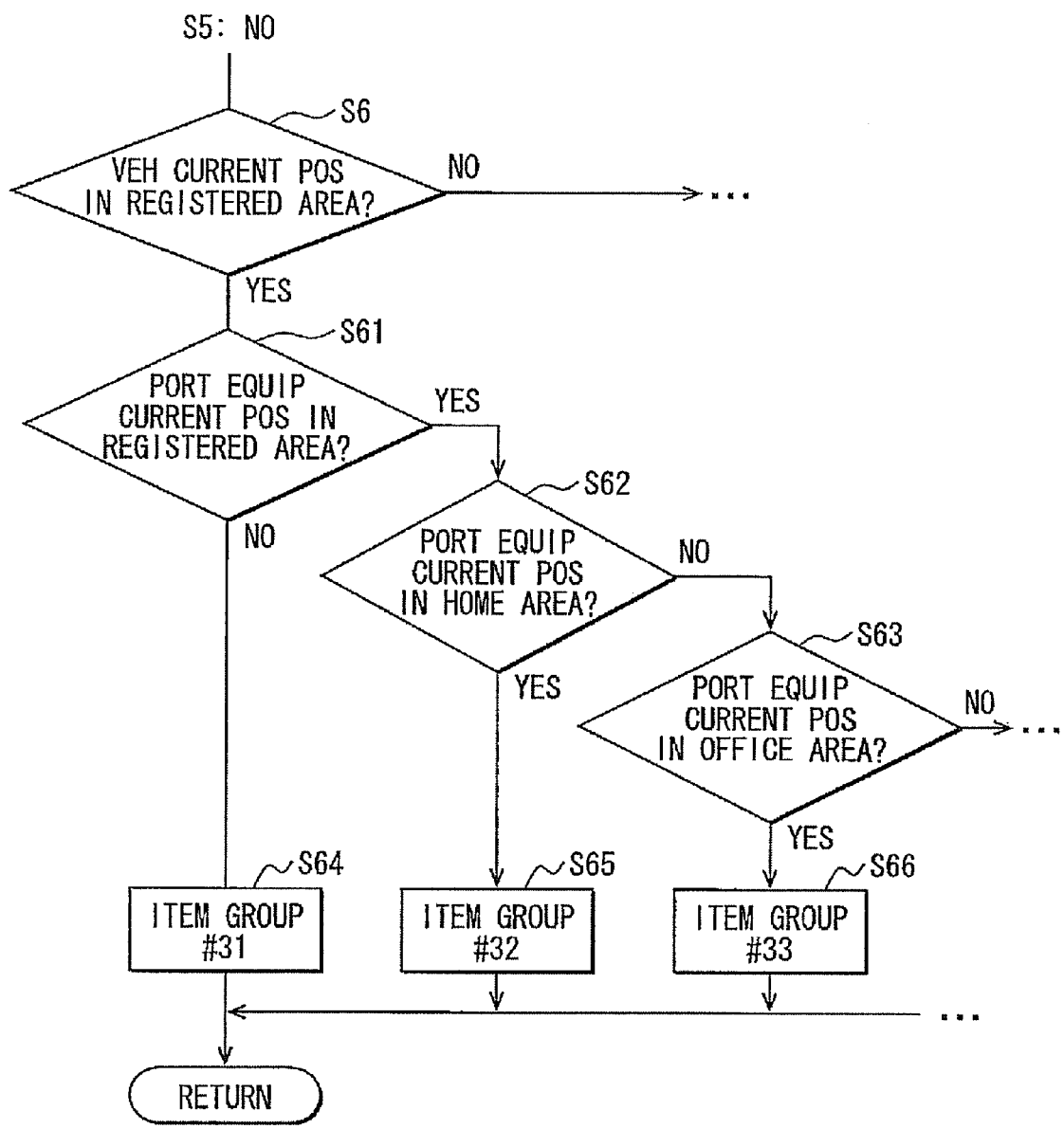
FIG. 10 is a flowchart describing the flow of processing continuing the processing mentioned in FIG. 9.
Figure 30:
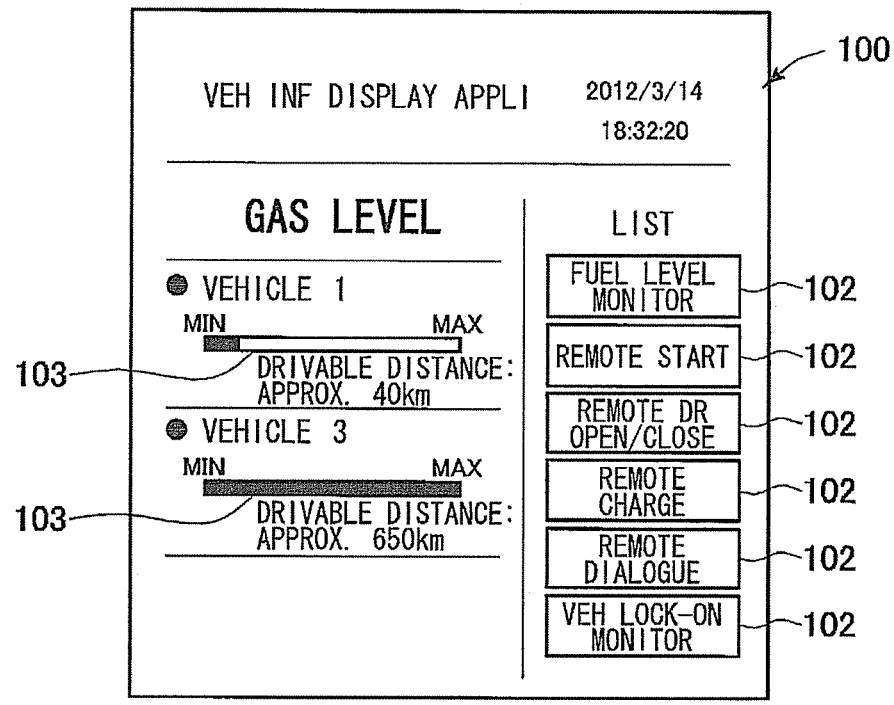
FIG. 30 is a diagram showing a third display example of the top page out of the associated vehicle pages to be displayed on the screen of the portable equipment.
Figure 31:
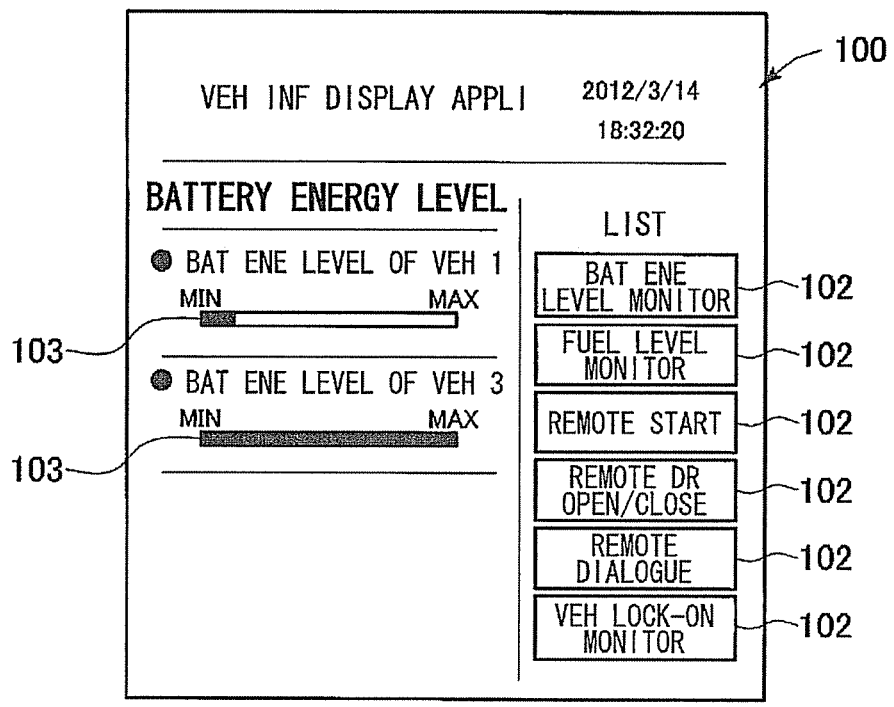
FIG. 31 is a diagram showing a fourth display example of the top page out of the associated vehicle pages to be displayed on the screen of the portable equipment.
Figure 32:
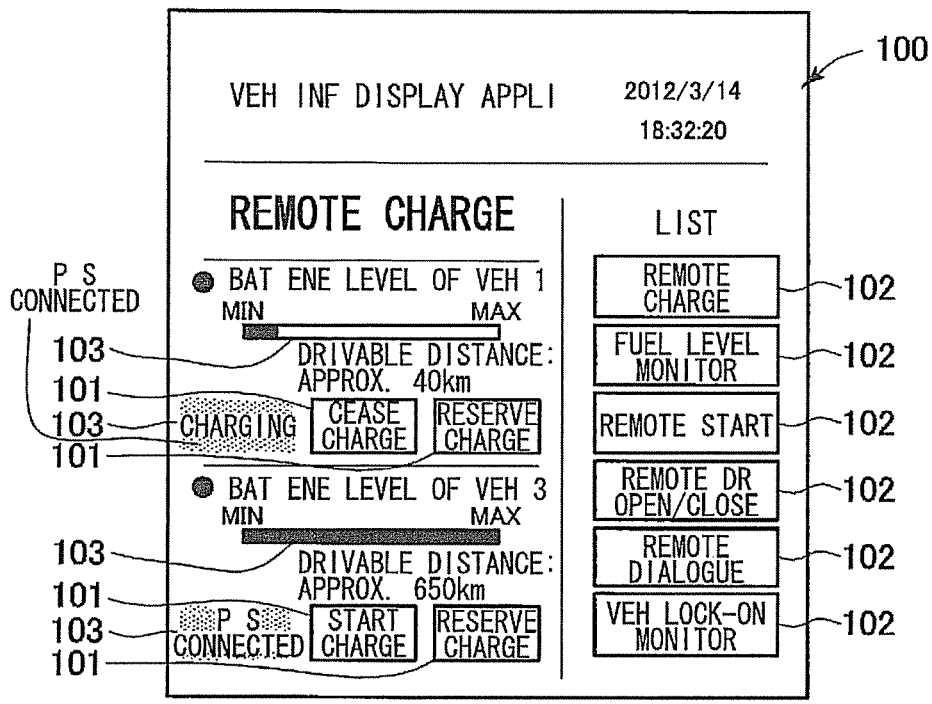
FIG. 32 is a diagram showing a fifth display example of the top page out of the associated vehicle pages to be displayed on the screen of the portable equipment.
Figure 33:
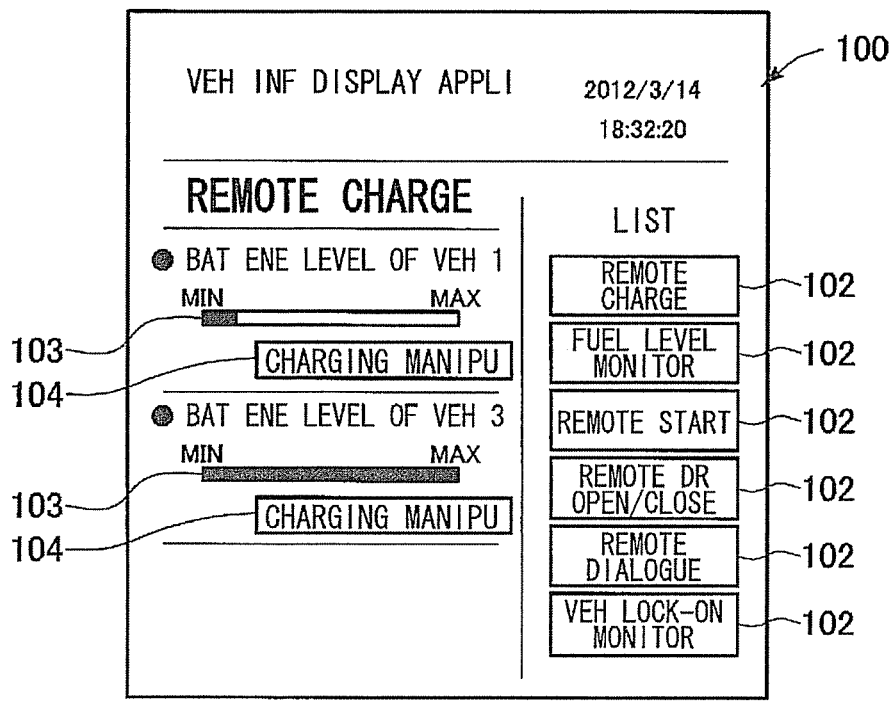
FIG. 33 is a diagram showing a sixth display example of the top page out of the associated vehicle pages to be displayed on the screen of the portable equipment.

At this time, pieces of information on the display item that is a top-priority item are, as shown in FIG. 30 to FIG. 33, listed in association with the respective display candidate vehicles 2. If the display item that is the top-priority item is the display item of fuel level monitoring, the pieces of information 103 representing the pieces of vehicle situation information on the display candidate vehicles 2 which are acquired at S1 in FIG. 7 are, as shown in FIG. 30 or FIG. 31, listed in association with the respective display candidate vehicles 2. If the display item that is the top-priority item is the display item of remote charge, pieces of information (operation images) 101 and 104 through each of which a manipulation to be performed in order to allow the associated display candidate vehicles 2 to implement a remote operation feature associated with the display item is accepted are, as shown in FIG. 32 or FIG. 33, listed in association with the respective display candidate vehicles 2. The pieces of information 101 may be, as shown in FIG. 32, operation buttons that are manipulated in order to directly implement the remote operation feature, and the pieces of information 104 may be, as shown in FIG. 33, page transition buttons to be manipulated in order to make a transition to a page through which the remote operation feature is implemented. In FIG. 32 and FIG. 33, not only the operation buttons 101 and 104 that are manipulated in order to directly implement the remote operation feature associated with the top-priority item but also the pieces of information 103 representing pieces of vehicle situation information associated with the top-priority item are displayed.

If pieces of information on the display item that is the top-priority item are listed in association with the respective display candidate vehicles 2 in the manner shown in FIG. 30 to FIG. 33, the priorities of the display candidate vehicles 2 may be determined, and the pieces of information may be listed in order according to the priorities. For example, the display priorities specified in FIG. 12 or FIG. 13 may be calculated based on pieces of vehicle situation information associated with the display item that is the top-priority item among pieces of vehicle situation information on the display candidate vehicles 2 acquired at S1 in FIG. 7. The pieces of vehicle situation information may then be shown in the top page 100 in such a manner that the pieces of vehicle situation information based on which the higher display priorities (smaller values) are calculated can be ranked higher. In FIG. 30 to FIG. 33, the display item of fuel level monitoring (gasoline level monitoring or battery energy level monitoring) or the display item of remote charge is determined as the top-priority item. In these cases, the display candidate vehicles 2 whose gasoline levels or battery energy levels represented by pieces of gasoline level information or battery energy level information included in the pieces of vehicle situation information on the display candidate vehicles 2 acquired at S1 in FIG. 7 are lower are given higher priorities, and are therefore ranked higher in the list. In another method, similarly to the method of determining the priorities of the associated vehicles 2 through the associated vehicle selection page 190 in the aforesaid first to sixth variants of the second embodiment, the priorities of the display candidate vehicles 2 may be determined, and pieces of information 103 and 104 on the display item, which is the top-priority item, concerning the display candidate vehicles 2 may be listed in order according to the priorities. The priorities of the associated vehicles 2 associated with the portable equipment 4 may be pre-determined on a fixed basis, and the pieces of information may be listed in order according to the priorities.

Assuming that plural associated vehicles 2 are selected and finalized as display candidate vehicles by performing the vehicle selecting manipulation, determination of display items (S139) and determination of priorities for each of the determined display items (S144) may be achieved according to any method other than the foregoing ones. For example, the priorities of the plural associated vehicles 2 associated with the portable equipment 4 may be pre-determined, and the display items and priorities thereof may be determined for the display candidate vehicle 2 of the top priority among the display candidate vehicles 2 selected through the vehicle selecting manipulation. Pieces of information on the determined display items may be displayed according to the priorities with respect to each of the display candidate vehicles 2.

Fourth Embodiment

Figure 1C:
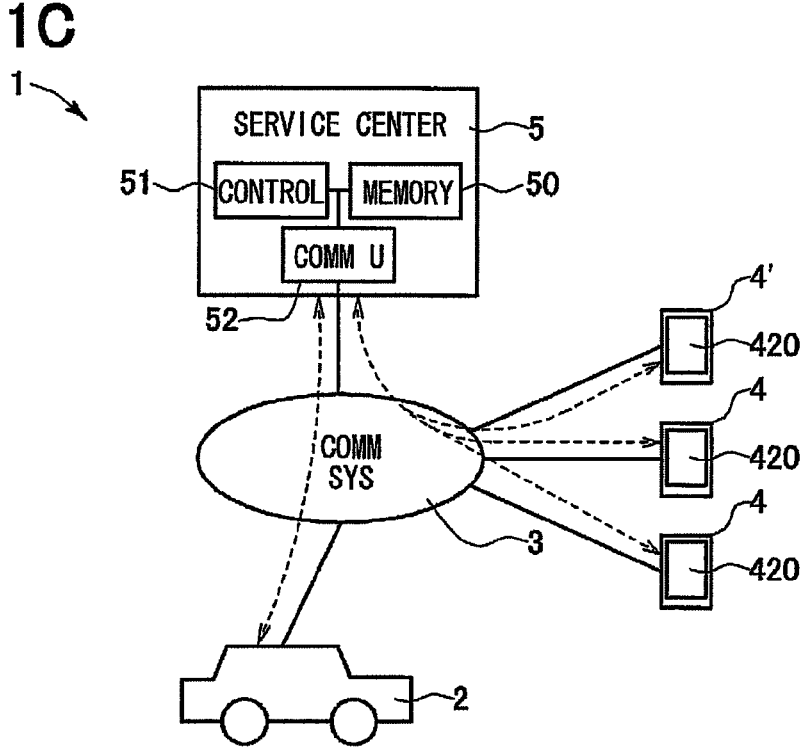
FIG. 1C is a block diagram schematically showing the configuration of a vehicle information display system that utilizes portable equipment of a fourth embodiment.

In the first embodiment, as shown in FIG. 1A, one associated vehicle 2 is associated with one pieces of portable equipment 4. Alternatively, as shown in FIG. 1C, one associated vehicle 2 may be associated with plural pieces of portable equipment 4 or an unspecified number of users.

An example of the third embodiment will be described below.

To begin with, display processing for the associated vehicle pages 100 will be described below. The processing is executed by the control unit 41 of the portable equipment 4 as mentioned in FIG. 34. Interlocked with the processing, the control unit 51 of the service center 5 executes processing mentioned in FIG. 35.

First, display processing for the associated vehicle pages 100 will be described in conjunction with FIG. 34 and FIG. 35. When the control unit 41 of the portable equipment 4 accepts an application running manipulation (reading requesting manipulation) performed by a user, the control unit 41 first displays on the screen 420 of the display unit 42 an authentication screen image (login page) through which the user is prompted to enter user authentication information (S1001). When the user authentication information (user ID and password) is entered by performing a predetermined manipulation at the operating unit 43, if the entry is finalized (Yes at S1002), the control unit 41 transmits the user authentication information, whose entry is finalized, to the service center (terminal equipment) 5 over the external communication means 3 (S1003), and enters a wait state for waiting for a result of authentication (S1004). These steps are identical to S101 to S104 in FIG. 4.

By the way, in the service center 5, master information for user authentication is stored in the memory unit 50. As mentioned in FIG. 35, the control unit 51 is waiting for receiving user authentication information (S501). On receipt of the user authentication information (Yes at S502), the control unit 51 performs authentication processing on the user authentication information on the basis of the master information, and decides whether the user is an authorized user. In addition, the control unit 51 discriminates a user type (user or administrator), and returns the result of authentication (result-of-authentication information signifying whether the user is an authorized user and user type information that is a result of discrimination on the user type) to the portable equipment 5 over the external communication means 3 (S504). As far as an unspecified number of users is concerned, pieces of master information are stored in association with the users in the memory unit 50. The master information has the user type and associated vehicle 2 associated with each other. Subsequent processing (S505 to S507) is identical to that in FIG. 24.

The control unit 41 of the portable equipment 4 receives the result of authentication (result-of-authentication information and user type information) from the service center 5 over the external communication equipment 3. If the authenticity is not established (No at S105), the control unit 41 returns to display of the authentication screen image (S1001). In other words, the control unit 41 inhibits display of the top page 100. In contrast, if the result of authentication demonstrates that the authenticity is established (Yes at S1005), the user type discriminated through authentication processing is identified (S1006).

If the identified user type signifies a general user (Yes at S1007), the control unit 41 displays the top page 100 out of associated vehicle pages for general users on the screen 420 of the display unit 42 (S1008). The top page 100 for general users in this case is, similarly to that in the first embodiment, displayed when the control unit 41 executes the processing mentioned in FIG. 5. After the top page 100 is displayed, if the aforesaid reading manipulation is enabled or a manipulation (reading terminating manipulation) for terminating the application is performed, the processing is terminated (S1009 to S1012). This is identical to that mentioned in FIG. 4 in relation to the first embodiment (S107 to S110).

Figure 36:
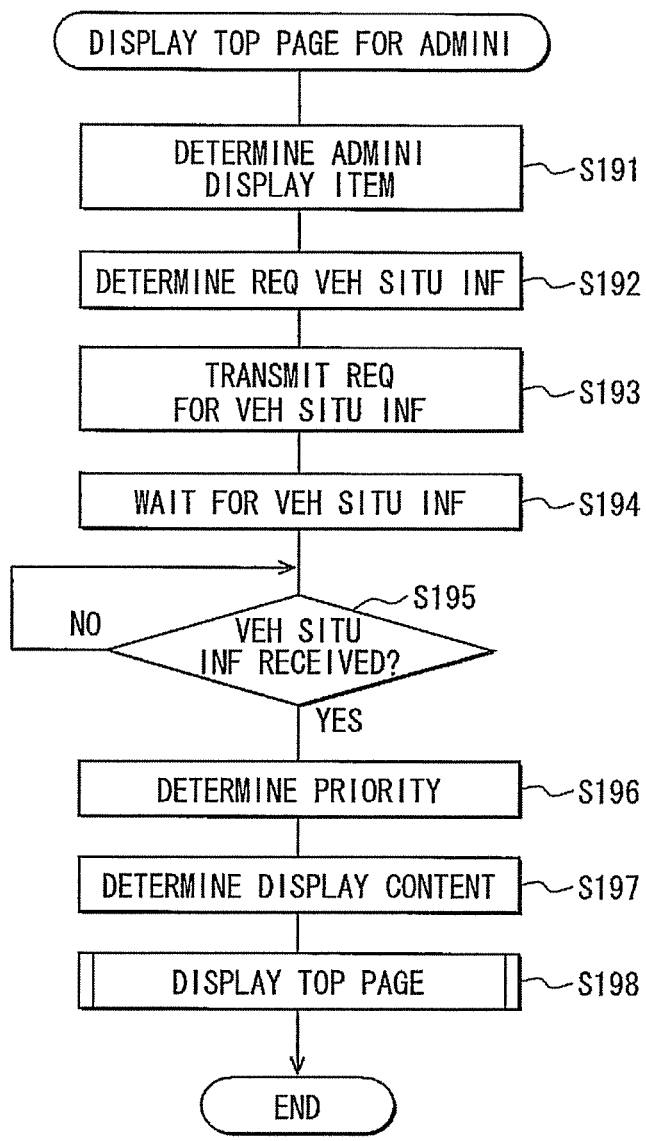
FIG. 36 is a flowchart describing the flow of administrator top page display processing.

If the identified user type signifies an administrator (No at S1007), the control unit 41 displays the top page 200 out of associated vehicle pages for administrators on the screen 420 of the display unit 42 (S1013). In this case, the control unit 41 identifies predetermined administrator items as mentioned in FIG. 36 (S191: administrator item identification means), and acquires pieces of vehicle situation information representing predetermined vehicle situations of the associated vehicle 2 which are associated with the identified administrator items (S192 to S195: second vehicle situation acquisition means) (a means for acquiring pieces of vehicle situation information at the time of displaying the top page for general users is a first vehicle situation acquisition means). Acquisition of pieces of vehicle situation information is achieved in the same manner as S122 to S125 in FIG. 5 relevant to the first embodiment because the display items are already determined).

The control unit 41 then identifies a top-priority administrator item from among the identified administrator items on the basis of the acquired pieces of vehicle situation information associated with the administrator items, and displays the top page for administrators 200 in such a manner that information on the top-priority administrator item can be most greatly highlighted (administrator page display control means). More particularly, the control unit 41 determines the display priorities of the identified administrator items on the basis of the acquired pieces of vehicle situation information associated with the administrator items (S196), determines the contents of display to be shown in the top page for administrators 200 so that the display priorities can be discerned (S197), and displays the top page 200 on the screen 420 of the display unit 42 (S198: page display control means). Herein, the administrator items 202 are listed according to the priorities. A method for determining the display priorities of the administrator items is identical to that employed at S126 in FIG. 5 relating to the first embodiment. However, the priorities of the administrator items may be determined on a fixed basis.

In a system for renting plural pieces of portable equipment 4 to users so that the users can utilize associated vehicles or a system in which an administrator is clearly discriminated from general users (vehicle users), pieces of portable equipment 4' dedicated to the general users may be made available. The pieces of portable equipment 4' have the same configuration as the portable equipment 4 does. However, the pieces of portable equipment 4' are configured so that part of the processing mentioned in FIG. 34 can be omitted in order to disable display of the administrator pages and the processing mentioned in FIG. 37 can be performed. Herein, if an administrator is authenticated (No at S1007), the fact that the portable equipment shall not be used by administrators is notified (S1018).

Fifth Embodiment

Figure 1D:
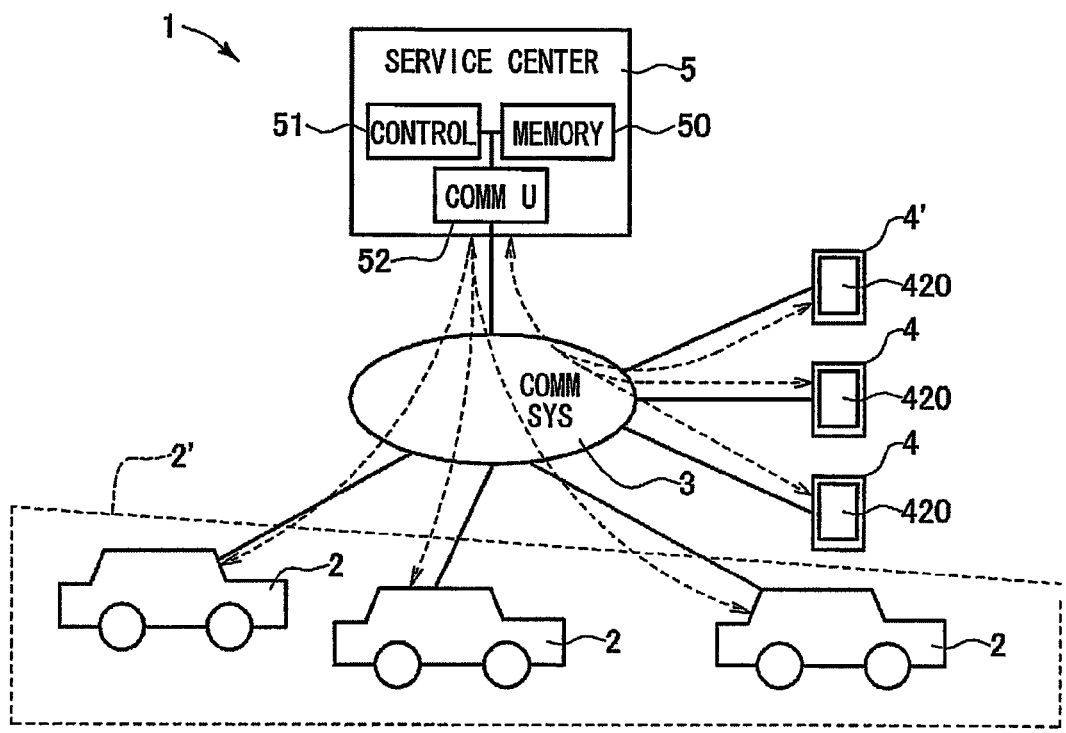
FIG. 1D is a block diagram schematically showing the configuration of a vehicle information display system that utilizes portable equipment of a fifth embodiment.

In the first embodiment, as shown in FIG. 1A, one associated vehicle 2 is associated with one piece of portable equipment 4. Alternatively, as shown in FIG. 1D, an unspecified number of (plural) associated vehicles 2 may be associated with plural pieces of portable equipment 4 or an unspecified number of users.

Figure 34:
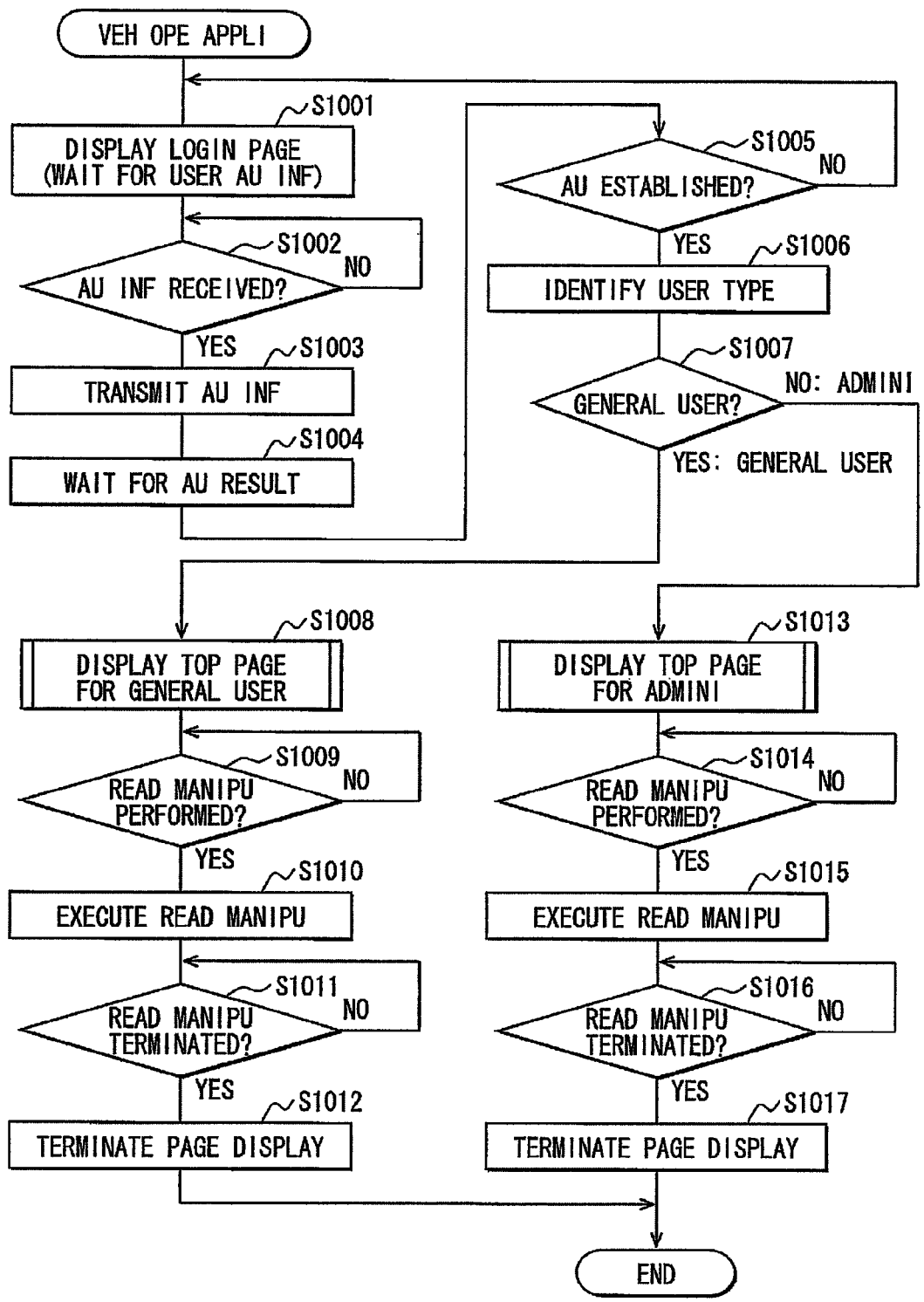
FIG. 34 is a flowchart describing the flow of the processing of the vehicle operation application to be executed in the portable equipment.
Figure 35:
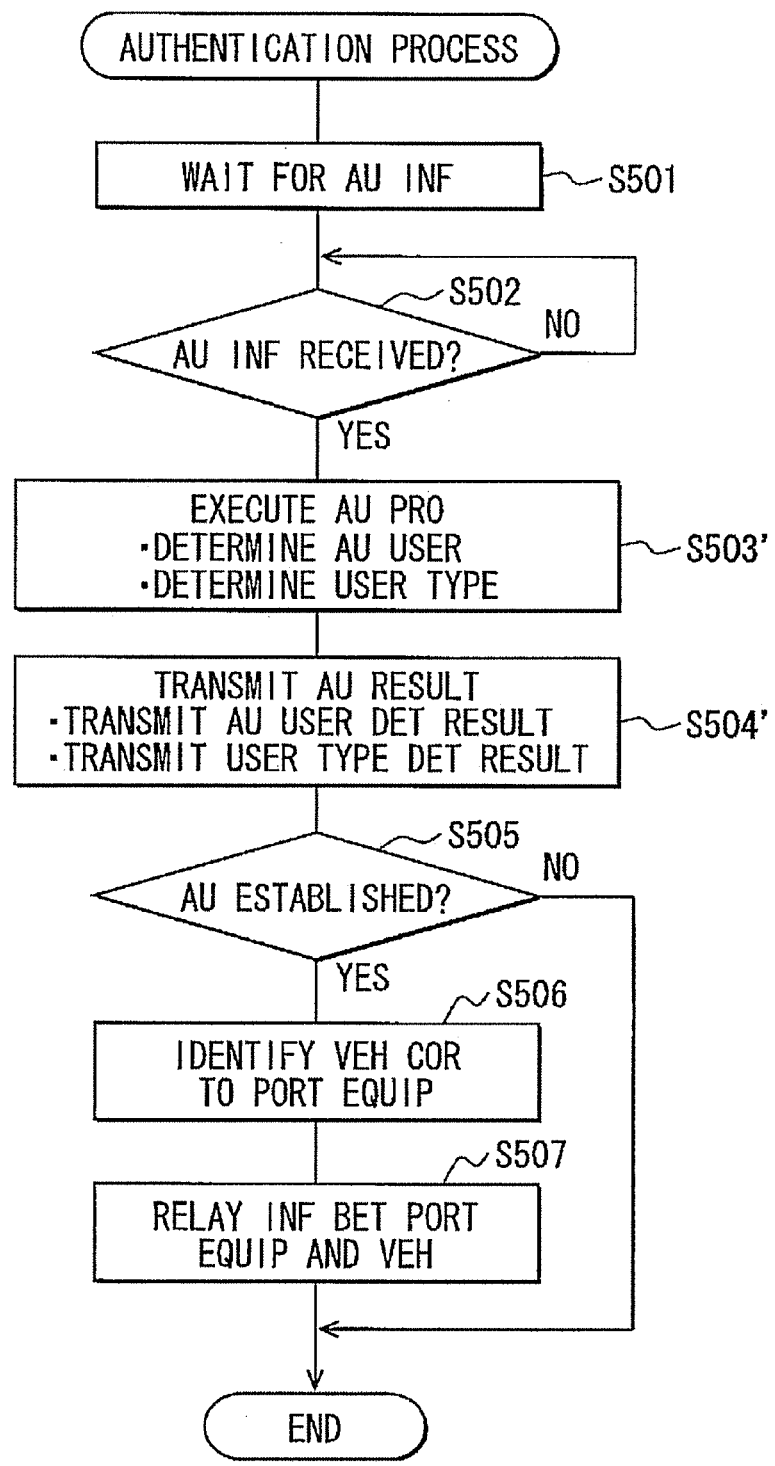
FIG. 35 is a flowchart describing the flow of authentication processing.
Figure 37:
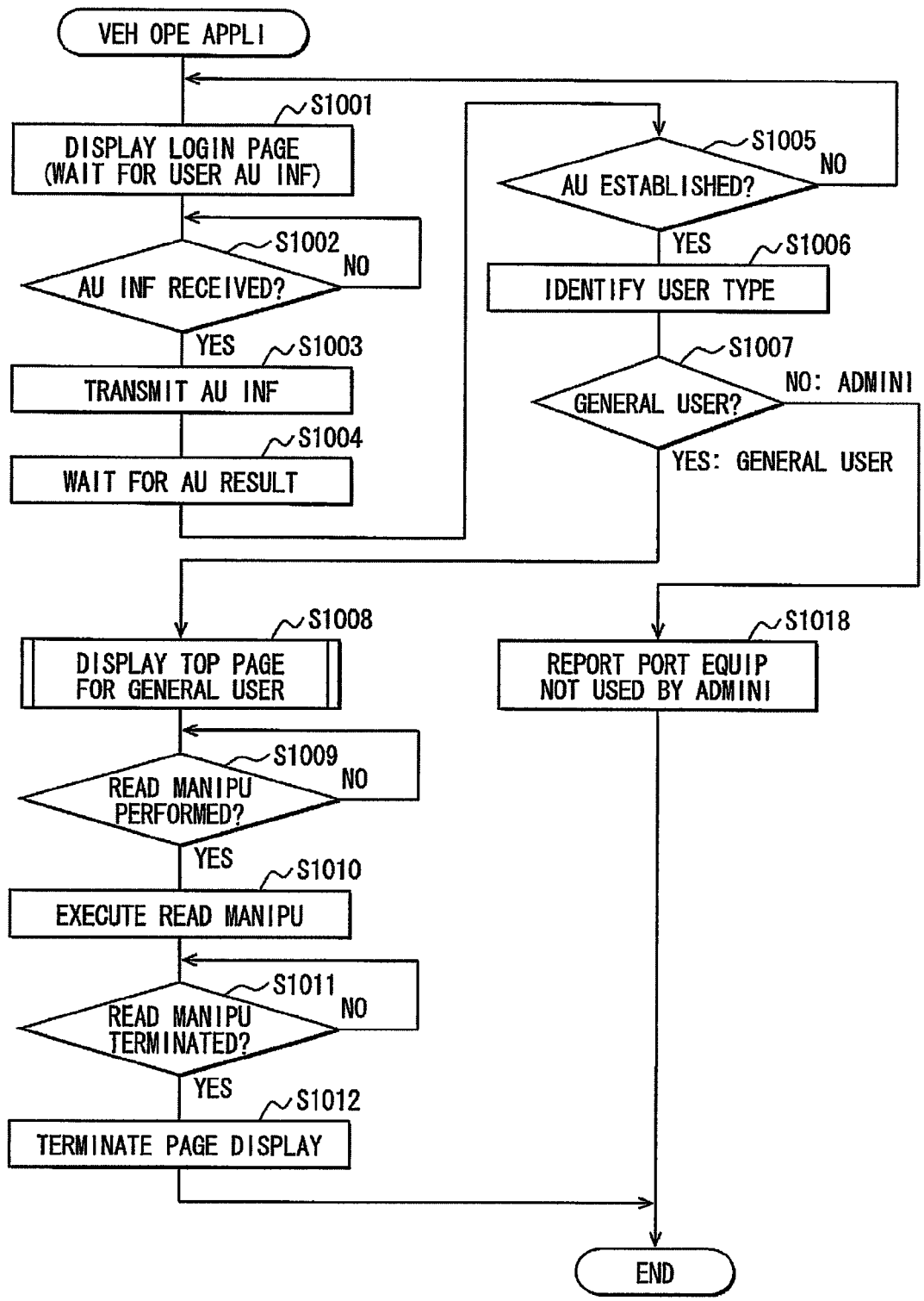
FIG. 37 is a flowchart describing the flow of processing of a vehicle operation application to be executed in portable equipment for general users.

In this case, the control unit 41 of the portable equipment 4 executes the processing mentioned in FIG. 34 (or FIG. 37), while the control unit 51 of the service center 5 executes the processing mentioned in FIG. 26 in a manner of being interlocked with the execution of the processing mentioned in FIG. 34 (or FIG. 37). When executing display of the top page for general users (S1008), the control unit 41 of the portable equipment 4 performs the processing mentioned in FIG. 29.

Now, an administrator top page 200 relevant to the fourth embodiment or fifth embodiment will be exemplified below.

Figure 38:
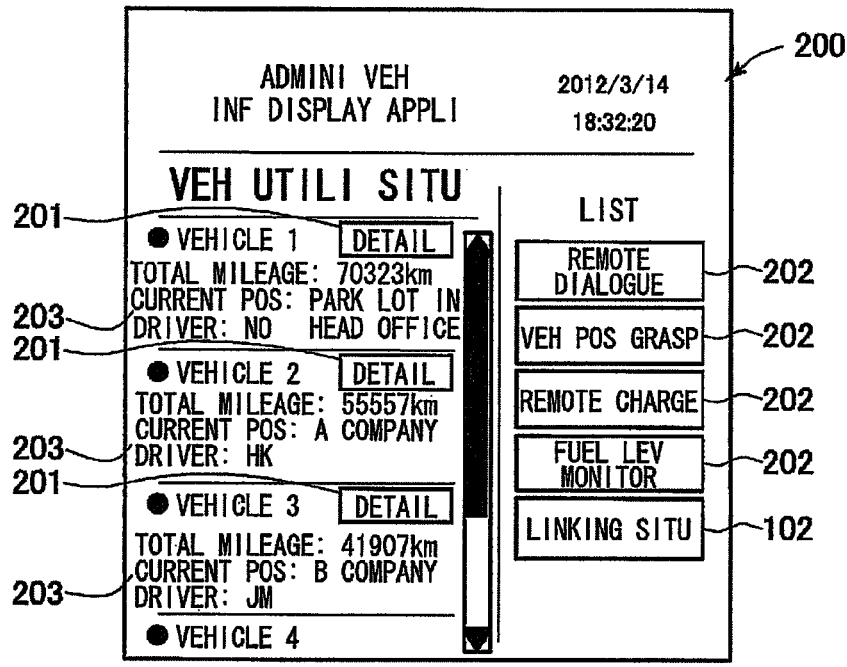
FIG. 38 is a diagram showing a first display example of a top page out of associated vehicle pages for administrators to be displayed on the screen of the portable equipment.

FIG. 38 shows the top page 200 out of associated vehicle pages for administrators which is, in a configuration including one or more pieces of portable equipment 4 for administration that are used to administer plural associated vehicles 2 (pieces of portable equipment whose user types are discriminated as administrators), displayed on the screens 420 of the pieces of portable equipment 4. An item of vehicle utilization situation that is an administrator item is determined as a top-priority item, and pieces of information 203 on the item are displayed. More particularly, total mileages indicating load levels incurred by the respective associated vehicles 2 are displayed. Further, the current positions of the respective associated vehicles 2 and pieces of information 103 such as drivers are displayed.

Figure 39:
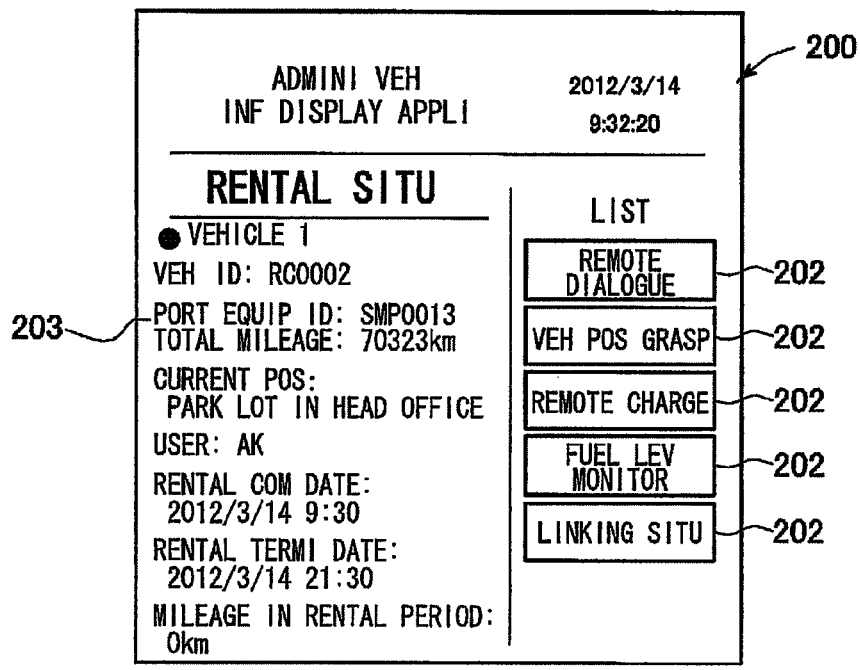
FIG. 39 is a diagram showing a display example of a page to which a transition is made when a Detail button in FIG. 38 is manipulated.

In the top page 200, the associated vehicles 2 selected from among the plural associated vehicles 2 by performing the vehicle selecting manipulation are listed. Operation images (operation buttons) 201 through which pieces of detailed information on the respective listed associated vehicles 2 are displayed are shown in display columns for the respective listed associated vehicles 2. By selecting and manipulating any of the operation images 201, a detailed information display page 201 for an individual vehicle like the one shown in FIG. 39 can be displayed. Herein, the portable equipment 4 for administration is used to administer an associated rental vehicle (associated vehicle) 2 and company vehicle (associated vehicle) 2. By manipulating any of the operation images (operation button) 201 in FIG. 38, the detail of the renting situation of the rental vehicle 2 or company vehicle 2 can be grasped.

Figure 40:
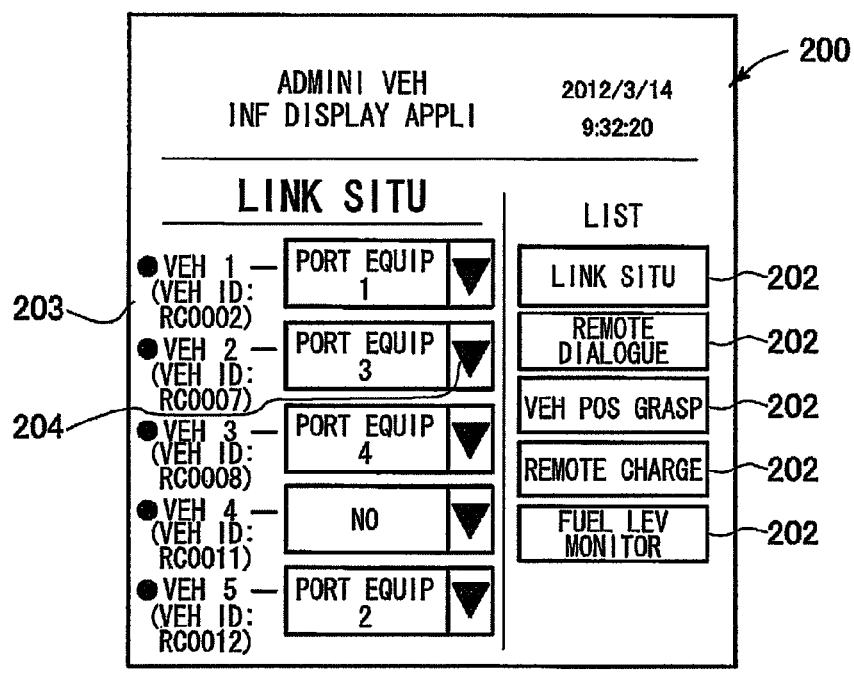
FIG. 40 is a diagram showing a second display example of the top page out of the associated vehicle pages for administrators to be displayed on the screen of the portable equipment.

In the case of the fifth embodiment, the portable equipment 4 for administration (portable equipment the user type of which is recognized as an administrator) may, as shown in FIG. 40, have as an administrator item a relationship-of-association designation item through which a relationship of association between the portable equipment 4 or a general user who carries the portable equipment and the vehicle 2 is designated. The case shown in FIG. 40 is concerned with a system in which the vehicle 2 and portable equipment 4 are rented as a set. When the vehicle and portable equipment are rented, user identification information (identification information of the portable equipment 4 to be rented) is appended, and the relationship of association between the identification information and the vehicle 2 is designated. In FIG. 40, pieces of vehicle information on plural vehicles 2 to be administered are displayed. In addition, a pull-down button 204 is included as a relationship-of-association designation manipulator through which the associated portable equipment 4 is selected. When the portable equipment 4 is selected by manipulating the pull-down button 204, a relationship of association can be set between the vehicle 2 associated with the pull-down button 204 and the selected portable equipment 4.

Figure 41:
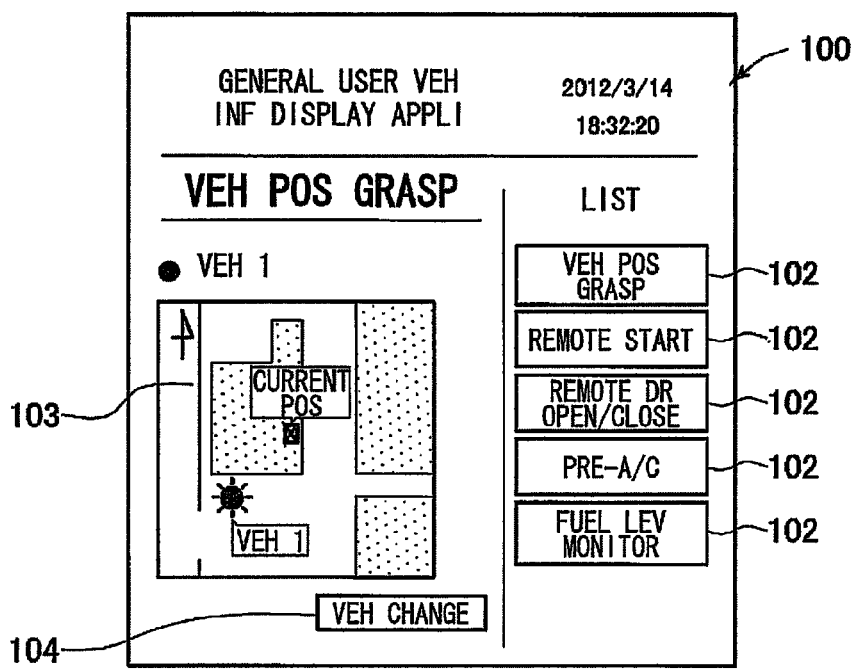
FIG. 41 is a diagram showing a display example of a top page out of associated vehicle pages for general users to be displayed on the screen of the portable equipment.

FIG. 41 shows the top page 100 out of associated vehicle pages for renter sides, that is, general users. Herein, the associated vehicle 2 is rented immediately previously, the portable equipment 4 exists in a vehicle renting company and the vehicle 2 exists in a parking lot in the premises. Therefore, a display item of vehicle position grasp is included in the list. In addition, since a date of rental is acquired as vehicle situation information signifying that the associated vehicle has been rented immediately previously, the display item of vehicle position grasp is displayed as a top priority so that the user who is the renter can readily reach the associated vehicle 2. Herein, the position of the user (portable equipment 4) and the position of the associated vehicle 2 that has been rented are shown in a map image as information 103 representing the positional relationship between the position of the user and the position of the associated vehicle.

In the fourth embodiment or fifth embodiment, designating a user type signifying whether a user is an administrator or general user may be omitted. In this case, all users are treated as general users. S1005, S1006, and S1007 are skipped in order to proceed to S1008.

(Other Variants)

In the aforesaid embodiments, the memory unit 44 has a storage area (vehicle area memory block) in which one or more vehicle areas are stored. Display items to be shown in the top page 100 are associated with each of the stored vehicle areas. In addition, the memory unit 44 has a storage area (user area memory block) in which one or more user areas are stored. The display items to be shown in the top page 100 are associated with each of the stored user areas. If the position of the associated vehicle 2 lies in a vehicle area stored in the memory unit 44, the display items associated with the vehicle area are picked up. If the position of the portable equipment 4 (that is, the position of the user) lies in a user area stored in the memory unit 44, the display items associated with the user area are picked up. However, if the position of the associated vehicle 2 lies in the vehicle area stored in the memory unit 44 and the position of the portable equipment 4 (that is, the position of the user) lies in the user area stored in the memory unit 44, the display items associated with both the vehicle area and user area are picked up. In the embodiments, since the display items are associated with each of the vehicle areas and each of the user areas, even if an area is newly registered, the newly registered area can be readily treated.

In the aforesaid embodiments, both the area in which the associated vehicle 2 exists and the area in which the portable equipment 4 exists are identified. Based on the results of the identification, display items are determined. Alternatively, only the area in which the position of the associated vehicle lies or the area in which the position of the portable equipment 4 lies may be identified, and the display items may be determined based on the results of the identification.

In the aforesaid embodiments, the priorities of display items are determined based on pieces of vehicle situation information associated with the display items. Alternatively, pieces of common vehicle situation information that are not associated with the display items and are different from the pieces of vehicle situation information associated with the display items may be acquired, and the priorities of the display items may be determined based on the pieces of common vehicle situation information. In the embodiments, as shown in FIG. 12 and FIG. 13, the display priorities are determined based on various situations represented by pieces of vehicle situation information associated with the display items. The display priorities of the display items may be corrected based on situations represented by the pieces of common vehicle situation information that are not associated with the display items. For example, in case the season is winter or the weather is snowy, the display priorities of the display items of pre-air conditioning and remote start may be corrected to get relatively higher than the display priorities of the other display items.

For determination of the priorities of display items, not only pieces of vehicle situation information associated with the display items but also pieces of other complementary information or pieces of other information may be taken into consideration. For example, another vehicle situation information that is different from pieces of vehicle situation information associated with the display items may be acquired as complementary information, and a display item that should be given priority may be identified on the basis of the situation of the vehicle 2 represented by the vehicle situation information. The display priority of the identified display item may then be corrected to get higher than the display priorities of the other display items. In this case, for example, the display item that should be given priority or display item that should not be given priority and a degree to which the display item should be given priority or a degree to which the display item should not be given priority are stored in the memory unit 44 in relation to each of various situations of the vehicle 2 represented by pieces of vehicle situation information or complementary information. By referencing the contents of storage, the display item that should be given priority or the display item that should not be given priority is identified, and the display priority of the display item is corrected. More particularly, as shown in FIG. 23, the display item (object-of-correction display item) that should be given priority or should not be given priority and a correction value to be used to correct a numerical value representing the display priority of the display item may be stored in relation to each of various situations (conditions for correction) of the vehicle 2 represented by pieces of vehicle situation information or complementary information. When the priorities of the display items are determined, the numerical values representing the priorities of the display items may be corrected based on the correction values (for example, through summation or multiplication).

As the pieces of vehicle situation information or complementary information, for example, time information, date information, user information (age, sex, whether a user is a main use of an associated vehicle, or the like), a moving velocity of portable equipment, weather information, and others can be cited.

In the aforesaid embodiments, transfer of information between the portable equipment 4 and the associated vehicle 2 is achieved via the external service center (external center) 5. The transfer may be performed directly without intervention of the service center (external center) 5. In the aforesaid embodiments, the service center (external center) 5 is intervened for improvement of security.

In the aforesaid embodiments, authentication processing is performed based on user identification information. Alternatively, the authentication processing may be performed based on identification information inherent to the portable equipment 4.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. Portable equipment for displaying a vehicle page, indicative of information relating to a vehicle corresponding to the portable equipment, on a screen of a display unit, the portable equipment comprising:
    a reading request receiving device that receives a predetermined reading request manipulation for requesting to display the vehicle page;
    a position information acquisition device that acquires position information of at least one of the portable equipment and the vehicle when the reading request receiving device receives the reading request manipulation;
    an item selection device that identifies a position of the at least one of the portable equipment and the vehicle according to the position information, specifies an area, in which the position of the at least one of the portable equipment and the vehicle is disposed, and selects an item of a top page, which is to be displayed initially as the vehicle page on the display unit, according to the area among a plurality of predetermined items; and
    a page display controller that controls the display unit to display the item of the top page on the screen.

2. The portable equipment according to claim 1, wherein:
    when the reading request receiving device receives the reading request manipulation, the position information acquisition device acquires position information of both of the portable equipment and the vehicle;
    the item selection device identifies the position of the portable equipment and the position of the vehicle according to the position information;
    the item selection device specifies the area of the portable equipment and the area of the vehicle; and
    the item selection device selects the item of the top page relating to the portable equipment and the item of the top page relating to the vehicle according to the area of the portable equipment and the area of the vehicle, respectively.

3. The portable equipment according to claim 1, further comprising:
    a vehicle condition acquisition device that acquires vehicle condition information indicative of a vehicle condition corresponding to the item when the item selection device selects the item, wherein:
    the item includes a plurality of item elements;
    the page display controller specifies a top-priority item element among the plurality of item elements according to the vehicle condition information; and the page display controller controls the display to display the top page on the screen in such a manner that at least the top-priority item element is highlighted.

4. The portable equipment according to claim 3, wherein:
the page display controller determines a priority of each item element, which are selected by the item selection device, according to the vehicle condition information; and
the page display controller controls the display to display the plurality of item elements on the top page in such a manner that each item element is displayed according to the priority.

5. The portable equipment according to claim 1, further comprising:
a memory unit that stores the plurality of items and a plurality of areas in such a manner that each area is stored in association with the item, wherein:
the item selection device selects the item of the top page corresponding to the area according to a storage content of the memory unit.

6. The portable equipment according to claim 5, wherein:
the item includes a plurality of item elements other than a certain item element, which is not necessary to be displayed on the screen.

7. The portable equipment according to claim 1, wherein:
the item includes a remote operation item element for executing a predetermined remote operation with respect to the vehicle; and
the page display controller executes the predetermined remote operation when an user inputs a predetermined manipulation to the remote operation item element on the display unit.

8. The portable equipment according to claim 7, further comprising:
a memory unit that stores the plurality of items and a plurality of areas in such a manner that each area is stored in association with the item, wherein:
the item selection device selects the item of the top page corresponding to the area according to a storage content of the memory unit;
the remote operation item element does not include an unnecessary usage item element, a physically impossible item element and an inhibition item element;
the unnecessary usage item element indicates that the remote operation is not necessary to be used in the area;
the physically impossible item element indicates that the remote operation is physically impossible in the area; and
the inhabitation item element indicates that the remote operation is inhibited in the area.

9. The portable equipment according to claim 1, wherein:
the vehicle includes a plurality of associated vehicles.

10. The portable equipment according to claim 9, further comprising:
a vehicle selection manipulation receiving device that receives a predetermined vehicle selection manipulation for selecting one of the plurality of associated vehicles, which is a candidate vehicle of a display object of the vehicle page, wherein:
the position information acquisition device acquires the position information of at least one of the portable equipment and the candidate vehicle;
the item selection device identifies the position of the at least one of the portable equipment and the candidate vehicle according to the position information;
the item selection device specifies the area, in which the position of the at least one of the portable equipment and the candidate vehicle is disposed,
the item selection device selects the item of the top page, which is to be displayed, initially as the vehicle page on the display unit, according to the area among the plurality of predetermined items; and
the page display controller controls the display unit to display the item of the top page relating to the candidate vehicle on the screen.

* * * * *